US011665743B2

(12) United States Patent
Zhang et al.

(10) Patent No.: US 11,665,743 B2
(45) Date of Patent: May 30, 2023

(54) RACH TYPE SELECTION AND DIFFERENT SETS OF RACH PARAMETERS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Somerset, NJ (US); Junyi Li, Chester, NJ (US); Kapil Gulati, Belle Mead, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/115,691

(22) Filed: Dec. 8, 2020

(65) Prior Publication Data
US 2022/0167420 A1 May 26, 2022

Related U.S. Application Data

(63) Continuation of application No. 17/102,261, filed on Nov. 23, 2020.

(51) Int. Cl.
*H04W 74/08* (2009.01)
*H04L 41/0803* (2022.01)

(52) U.S. Cl.
CPC ..... *H04W 74/0833* (2013.01); *H04L 41/0803* (2013.01)

(58) Field of Classification Search
CPC .......... H04W 74/0833; H04L 41/0803; H04L 5/0053; H04L 5/14; H04L 5/0048
See application file for complete search history.

(56) References Cited

U.S. PATENT DOCUMENTS 8,218,609 B2 * 7/2012 Walton ............... H04L 27/2602
375/377
2010/0296451 A1 * 11/2010 Li ....................... H04L 5/0005
370/328

(Continued)

FOREIGN PATENT DOCUMENTS

WO 2020019138 A1 1/2020

OTHER PUBLICATIONS

International Search Report and Written Opinion—PCT/US2021/052991—ISA/EPO—dated Feb. 1, 2022.

*Primary Examiner* — Wutchung Chu
(74) *Attorney, Agent, or Firm* — Procopio, Cory, Hargreaves & Savitch LLP

(57) ABSTRACT

A UE may receive, from a base station, a configuration for a plurality of parameter sets that each include one or more parameters for a RACH message and are each associated with one of TDM, FDM, or SDM. The UE may determine a transmission type of the RACH message corresponding to one or more of the TDM, the FDM, or the SDM and transmit the RACH message to the base station based on at least one parameter set and the determined transmission type of the RACH message. In aspects, the configuration received by the UE may be a configuration for transmitting the RACH message based on a RACH determination protocol. The UE may transmit the RACH message to the base station based on the received configuration associated with the RACH determination protocol and the determined at least one transmission type of the RACH message.

26 Claims, 14 Drawing Sheets

(56) References Cited

U.S. PATENT DOCUMENTS

| | | | |
|---|---|---|---|
| 2013/0114515 A1* | 5/2013 | Koo | H04J 11/0023 370/328 |
| 2013/0272241 A1* | 10/2013 | Ohta | H04W 72/1284 370/329 |
| 2014/0064225 A1* | 3/2014 | Iwai | H04W 74/004 370/329 |
| 2014/0086168 A1* | 3/2014 | Bao | H04W 99/00 370/329 |
| 2018/0020365 A1* | 1/2018 | Xiong | H04W 24/02 |
| 2018/0092139 A1* | 3/2018 | Novlan | H04W 76/12 |
| 2018/0324850 A1* | 11/2018 | Amuru | H04W 74/006 |
| 2019/0014500 A1* | 1/2019 | Abedini | H04W 16/00 |
| 2019/0014533 A1* | 1/2019 | Abedini | H04W 74/008 |
| 2019/0053120 A1* | 2/2019 | Park | H04W 36/305 |
| 2019/0110302 A1* | 4/2019 | Zhang | H04W 72/1289 |
| 2019/0132882 A1* | 5/2019 | Li | H04W 74/0816 |
| 2019/0150190 A1* | 5/2019 | Kim | H04W 56/00 370/329 |
| 2019/0230580 A1* | 7/2019 | Kim | H04W 48/16 |
| 2019/0342896 A1* | 11/2019 | Kusashima | H04W 72/046 |
| 2020/0059957 A1* | 2/2020 | Pan | H04L 5/0094 |
| 2020/0145888 A1* | 5/2020 | Paladugu | H04W 36/0069 |
| 2020/0145967 A1* | 5/2020 | Park | H04W 72/042 |
| 2020/0221503 A1* | 7/2020 | Kusashima | H04W 74/0833 |
| 2020/0236716 A1* | 7/2020 | Lei | H04W 72/042 |
| 2020/0245364 A1* | 7/2020 | Kim | H04L 1/1887 |
| 2020/0396632 A1* | 12/2020 | Ramachandra | H04W 24/10 |
| 2021/0051672 A1* | 2/2021 | Rastegardoost | H04W 72/0493 |
| 2021/0083828 A1* | 3/2021 | Matsuda | H04L 5/0028 |
| 2021/0152409 A1* | 5/2021 | Pan | H04W 74/08 |
| 2021/0160875 A1* | 5/2021 | Zhang | H04W 74/0833 |
| 2021/0175964 A1* | 6/2021 | Kusashima | H04B 7/18513 |
| 2021/0298088 A1* | 9/2021 | Qi | H04W 74/0833 |
| 2021/0378025 A1* | 12/2021 | Lin | H04W 74/004 |
| 2021/0378031 A1* | 12/2021 | Chai | H04W 72/1263 |
| 2022/0007423 A1* | 1/2022 | Agiwal | H04W 74/0833 |
| 2022/0022141 A1* | 1/2022 | Cirik | H04W 52/325 |
| 2022/0046714 A1* | 2/2022 | Zhou | H04W 72/23 |
| 2022/0053554 A1* | 2/2022 | Chen | H04W 74/006 |
| 2022/0070941 A1* | 3/2022 | Farag | H04W 74/006 |
| 2022/0078826 A1* | 3/2022 | Lee | H04W 72/1273 |
| 2022/0078856 A1* | 3/2022 | Jeon | H04L 1/1854 |
| 2022/0078858 A1* | 3/2022 | Matsuda | H04W 76/27 |
| 2022/0095350 A1* | 3/2022 | Lee | H04L 5/00 |
| 2022/0124763 A1* | 4/2022 | Takeda | H04W 72/1273 |
| 2022/0231809 A1* | 7/2022 | Cha | H04W 72/044 |
| 2022/0304045 A1* | 9/2022 | Yao | H04W 74/004 |

* cited by examiner

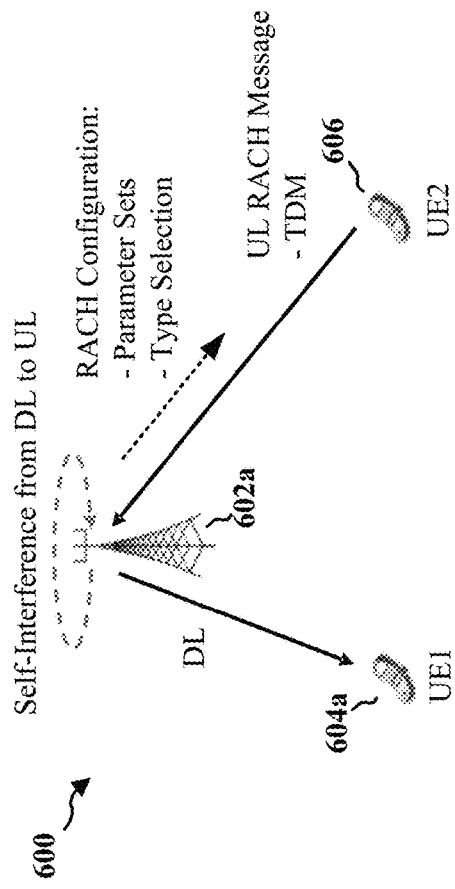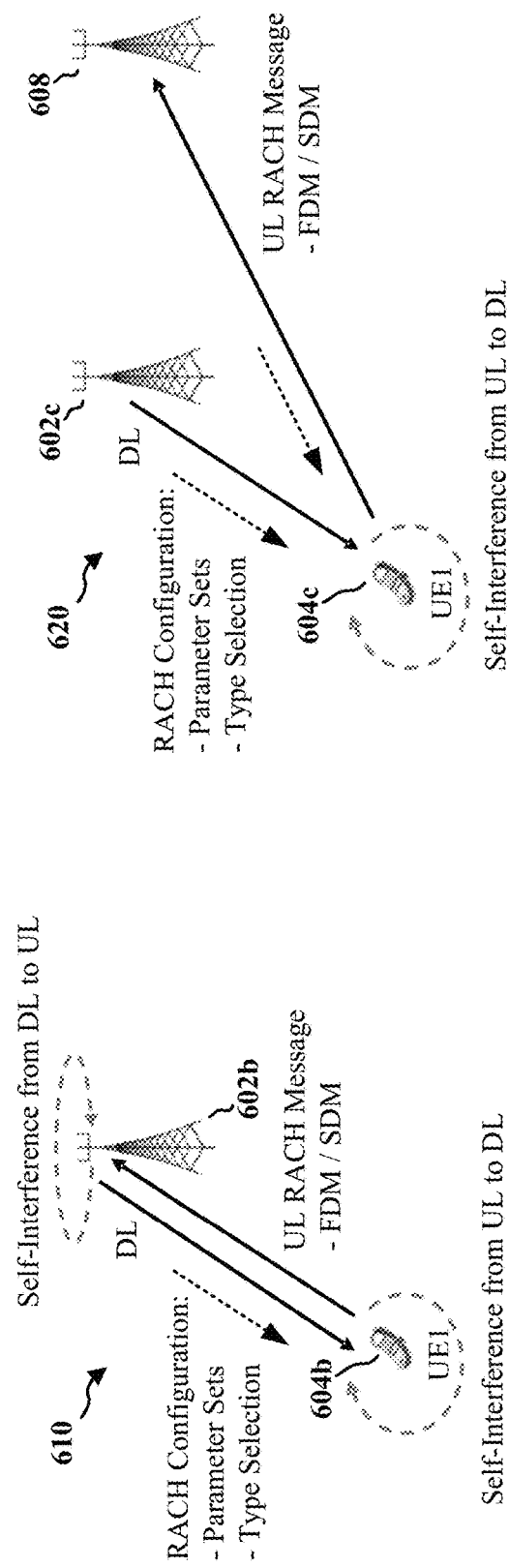
FIG. 6A
FIG. 6B
FIG. 6C

RACH TYPE SELECTION AND DIFFERENT SETS OF RACH PARAMETERS

CROSS REFERENCE TO RELATED APPLICATION(S)

This application is a continuation of U.S. Non-provisional application Ser. No. 17/102,261, entitled "RACH TYPE SELECTION AND DIFFERENT SETS OF RACH PARAMETERS" and filed on Nov. 23, 2020, which is expressly incorporated by reference herein in its entirety.

BACKGROUND

Technical Field

The present disclosure relates generally to communication systems, and more particularly, to random access channel (RACH) type selection and different sets of RACH parameters.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory and at least one processor coupled to the memory and configured to: receive a configuration for a plurality of parameter sets, each of the plurality of parameter sets includes one or more parameters for a random access channel (RACH) message and is associated with one of time division multiplexing (TDM), frequency division multiplexing (FDM), or spatial division multiplexing (SDM); determine a transmission type of the RACH message, the transmission type corresponding to one or more of the TDM, the FDM, or the SDM; and transmit the RACH message based on at least one parameter set of the plurality of parameter sets, the at least one parameter set associated with the determined transmission type of the RACH message.

In an aspect of the disclosure, a method, a computer-readable medium, and an apparatus are provided. The apparatus may include a memory and at least one processor coupled to the memory and configured to: transmit a configuration for a plurality of parameter sets, each of the plurality of parameter sets includes one or more parameters for a RACH message and is associated with one of TDM, FDM, or SDM; and receive the RACH message based on at least one parameter set of the plurality of parameter sets, the at least one parameter set associated with a transmission type of the RACH message, the transmission type corresponding to one or more of the TDM, the FDM, or the SDM.

In an aspect of the disclosure, a method, a computer-readable medium, and an apparatus are provided. The apparatus may include a memory and at least one processor coupled to the memory and configured to: receive a configuration for transmitting a RACH message, the configuration associated with a plurality of transmission types including TDM, FDM, and SDM; determine at least one transmission type of the plurality of transmission types for the RACH message, the at least one transmission type corresponding to one or more of the TDM, the FDM, or the SDM; and transmit the RACH message based on the received configuration for the RACH message and the determined at least one transmission type of the RACH message.

In an aspect of the disclosure, a method, a computer-readable medium, and an apparatus are provided. The apparatus may include a memory and at least one processor coupled to the memory and configured to: transmit a configuration for a RACH message, the configuration associated with a plurality of transmission types including TDM, FDM, and SDM; and receive the RACH message based on the transmitted configuration for the RACH message and at least one transmission type of the plurality of transmission types of the RACH message, the at least one transmission type corresponding to one or more of the TDM, the FDM, or the SDM.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A-6C illustrate diagrams for full duplex (FD) operations of a UE and a base station.

DETAILED DESCRIPTION

Figure 1:
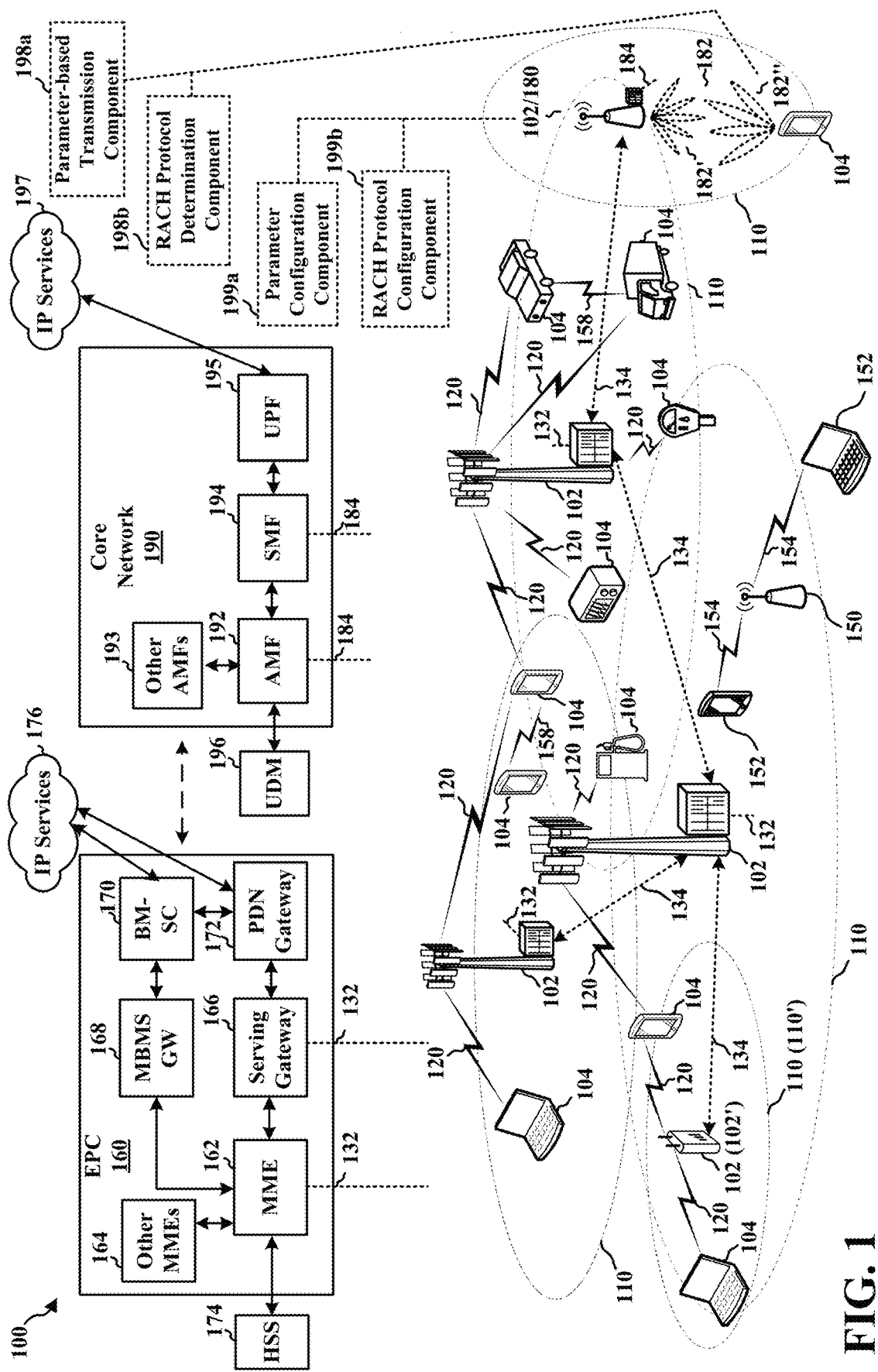
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a parameter-based transmission component 198a configured to receive a configuration for a plurality of parameter sets, each of the plurality of parameter sets includes one or more parameters for a random access channel (RACH) message and is associated with one of time division multiplexing (TDM), frequency division multiplexing (FDM), or spatial division multiplexing (SDM); determine a transmission type of the RACH message, the transmission type corresponding to one or more of the TDM, the FDM, or the SDM; and transmit the RACH message based on at least one parameter set of the plurality of parameter sets, the at least one parameter set associated with the determined transmission type of the RACH message. In certain aspects, the base station 180 may include a parameter configuration component 199a configured to transmit a configuration for a plurality of parameter sets, each of the plurality of parameter sets includes one or more parameters for a RACH message and is associated with one of TDM, FDM, or SDM; and receive the RACH message based on at least one parameter set of the plurality of parameter sets, the at least one parameter set associated with a transmission type of the RACH message, the transmission type corresponding to one or more of the TDM, the FDM, or the SDM. In certain aspects, the UE 104 may include a RACH protocol determination component 198b configured to receive a configuration for transmitting a RACH message, the configuration associated with a plurality of transmission types including TDM, FDM, and SDM; determine at least one transmission type of the plurality of transmission types for the RACH message, the at least one transmission type corresponding to one or more of the TDM, the FDM, or the SDM; and transmit the RACH message based on the received configuration for the RACH message and the determined at least one transmission type of the RACH message. In certain aspects, the base station 180 may include a RACH protocol configuration component 199b configured to transmit a configuration for a RACH message, the configuration associated with a plurality of transmission types including TDM, FDM, and SDM; and receive the RACH message based on the transmitted configuration for the RACH message and at least one transmission type of the plurality of transmission types of the RACH message, the at least one transmission type corresponding to one or more of the TDM, the FDM, or the SDM. Although the following description may be focused on 5G NR, the concepts described herein may be applicable to other similar areas, such as LTE, LTE-A, CDMA, GSM, and other wireless technologies.

Figure 2:
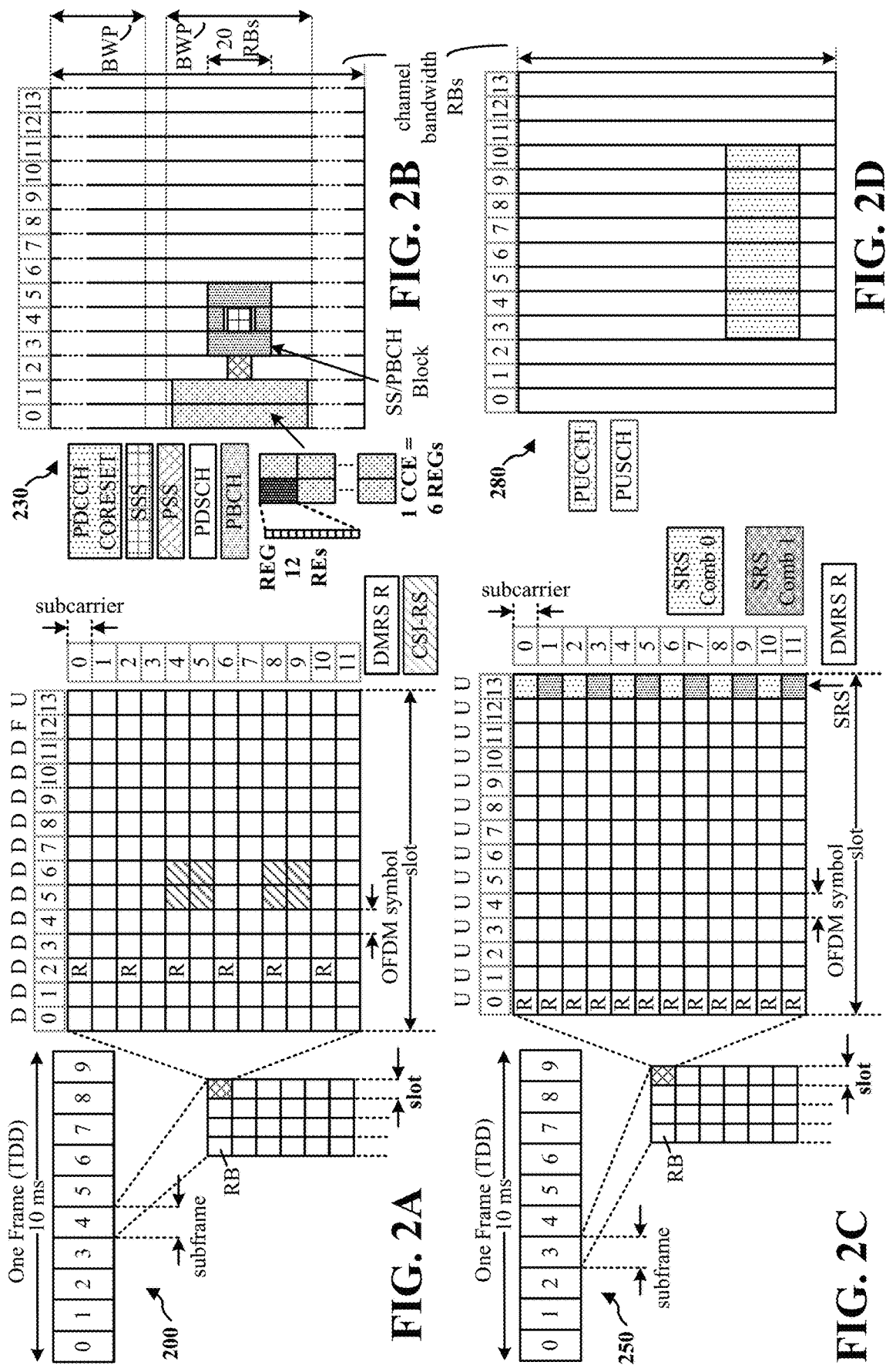
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
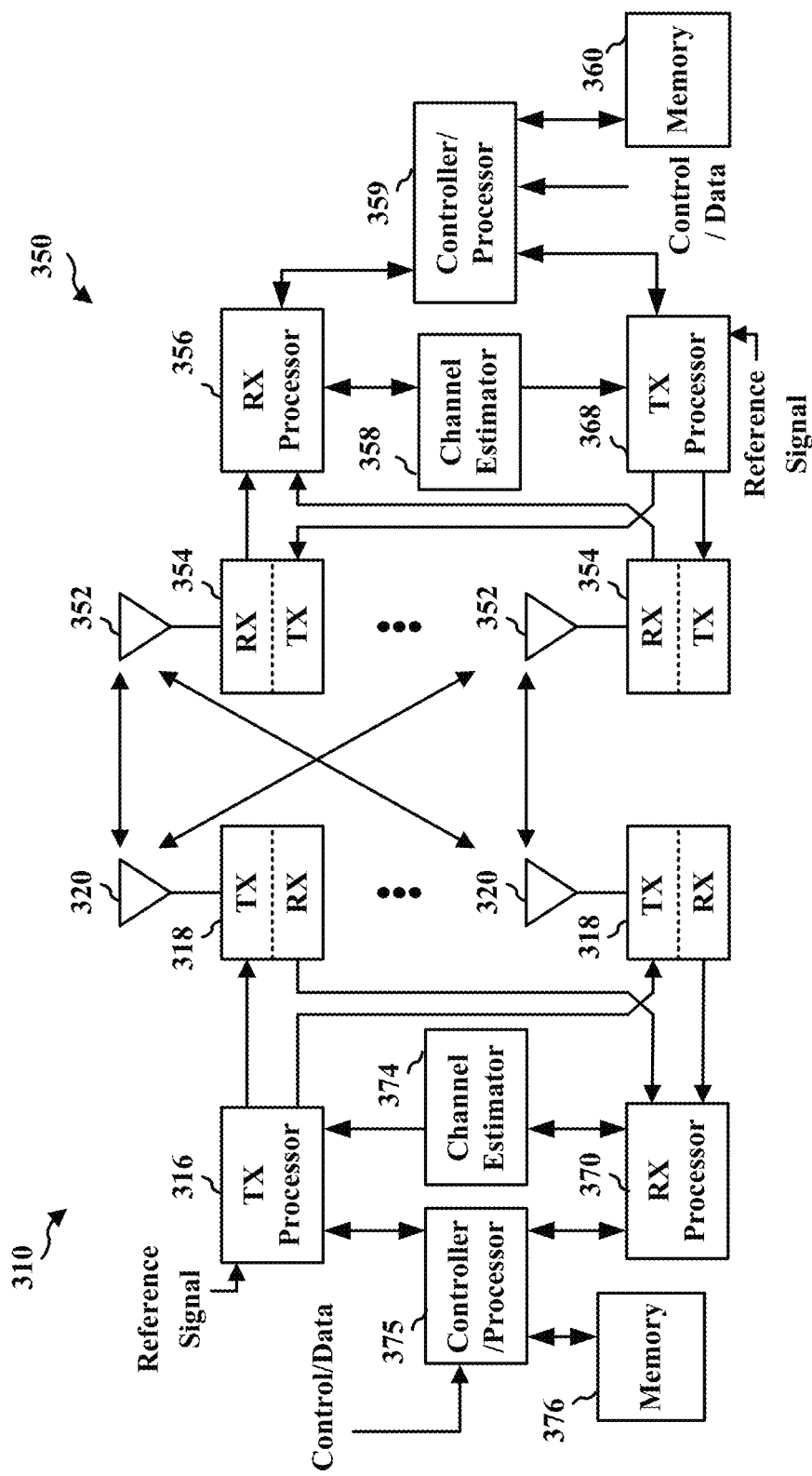
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198a-198b of FIG. 1.

At least one of the TX processor 316, the RX processor 370, and the controller/processor 375 may be configured to perform aspects in connection with 199a-199b of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
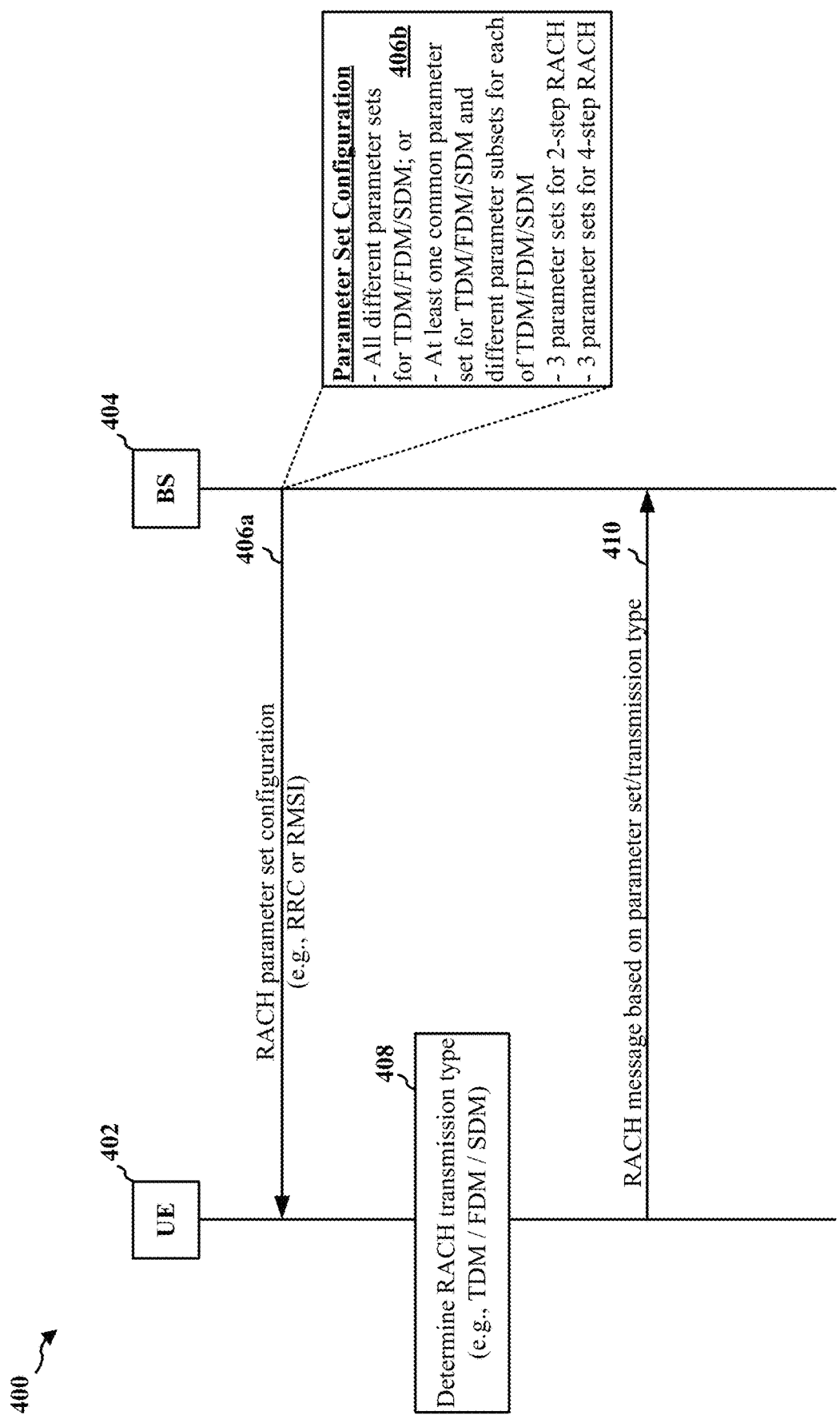
FIG. 4 is a call flow diagram illustrating communications between a UE and a base station.

FIG. 4 is a call flow diagram 400 illustrating communications between a UE 402 and a base station 404. At 406a, the base station 404 may transmit a RACH parameter set configuration 406b to the UE 402. The parameter set configuration 406b may include all different parameter sets for TDM/FDM/SDM; or the parameter set configuration 406b may include at least one common parameter set for TDM/FDM/SDM and different parameter subsets for each of TDM/FDM/SDM. In aspects, the parameter set configuration may include 3 parameter sets for 2-step RACH procedures and an additional 3 parameter sets for 4-step RACH procedures. The base station 404 may transmit the RACH parameter set configuration to the UE 402 via RRC signaling in a connected mode; or the base station 404 may transmit the RACH parameter set configuration to the UE 402 via RMSI in a broadcast mode.

At 408, the UE 408 may determine a RACH transmission type for a RACH message. The RACH transmission type may correspond to one or more of the TDM, the FDM, or the SDM. At 410, the UE 402 may transmit the RACH message to the base station 404 based on the parameter set and the determined RACH transmission type.

Figure 5:
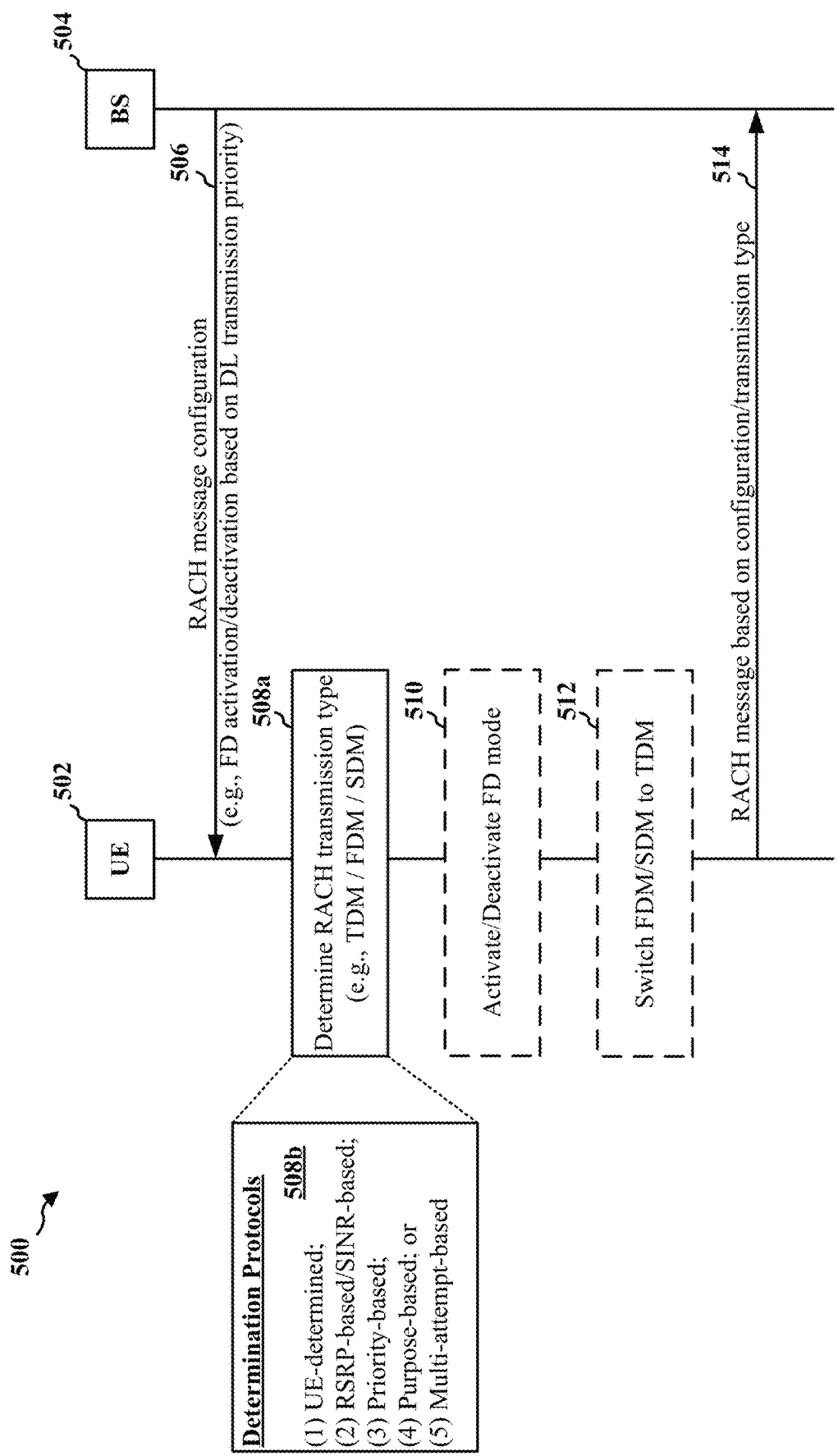
FIG. 5 is a call flow diagram illustrating communications between a UE and a base station.

FIG. 5 is a call flow diagram 500 illustrating communications between a UE 502 and a base station 504. At 506, the base station may transmit a RACH message configuration to the UE 502. In aspects, the RACH message configuration may be indicative of FD activation/deactivation based on a DL transmission priority. At 508a, the UE 502 may determine a RACH transmission type (e.g., corresponding to any of TDM/FDM/SDM). The determination, at 508a, by the UE 502 may be based on determination protocols 508b. For example, a first protocol of the determination protocols 508b may correspond to a UE-determined RACH transmission type. A second protocol of the determination protocols 508b may correspond to a reference signal received power (RSRP)-based or a signal-to-interference-plus-noise ratio (SINR)-based determination of the RACH transmission type. A third protocol of the determination protocols 508b may correspond to a priority-based determination of the RACH transmission type. A fourth protocol of the determination protocols 508b may correspond to a purpose-based determination of the RACH transmission type. A fifth protocol of the determination protocols 508b may correspond to a multi-attempt-based determination of the RACH transmission type.

At 510, the UE 502 may activate/deactivate a FD mode of transmission. For example, an FD RACH may be deactivated to increase a likelihood of successfully receiving a high-priority DL transmission from the base station 504 without self-interference at the UE 502. Thus, the UE 502 may switch, at 512, the transmission type from FDM or SDM (e.g., which may be associated with FD modes of transmission) to TDM (e.g., which may be associated with a HD mode of transmission). The UE 502 may activate, at 510, the FD mode of transmission in association with low-priority DL transmissions from the base station 504. At 514, the UE 502 may transmit the RACH message to the base station 504 based on the received configuration and the determined transmission type.

FIGS. 6A-6C illustrate diagrams 600-620 for FD operations of a UE 604b-604c and a base station 602a-602b. FD operations may be based on simultaneous UL and DL transmissions at the UE 604b-604c and/or the base station 602a-602b. In some configurations, the simultaneous UL and DL transmissions may occur in frequency range 2 (FR2). However, in other configurations, the simultaneous UL and DL transmissions may occur at a lower frequency, such as frequency range 1 (FR1) or another lower frequency, or the simultaneous UL and DL transmissions may occur at a higher frequency, such as frequency range 4 (FR4). Either or both of the UE 604a-604c and the base station 602a-602c may be configured with FD capabilities. For example, in the diagram 600, a base station 602a may transmit to UE1 604a while receiving from UE2 606 or, in the diagram 620, a UE 604c may receive from a first base station 602c/first transmission-reception point (TRP1) while transmitting to a second base station 608/second transmission-reception point (TRP2), where TRP1 and TRP2 may be associated with a same serving cell. In another example associated with the diagram 610, a UE 604b and a base station 602b/TRP may transmit and receive from each other at a same time.

An UL signal may be associated with a first panel of the UE 604b-604c and the base station 602a-602b and a DL signal may be associated with a second panel of the UE 604b-604c and the base station 602a-602b. For example, the UE 604b-604c may include two separate panels, such as a panel for UL transmissions at a first side of the UE 604b-604c and a panel for DL transmissions at a second side of the UE 604b-604c. Each panel may have independent baseband digital radio frequency (RF) chains for forming a beam at a time of the panel. Based on the independent baseband digital RF chains, the separate panels may form separate beams for simultaneously transmitting and receiving at the UE 604b-604c at the same time. In aspects, whether the UE or the base station may support simultaneous transmission and reception via the separate beams from two different panels at the same time may be conditioned upon beam separation and/or other parameters. If the UE 604b-604c is transmitting to the base station 602b/608 via a transmission panel, but the signal strength of the transmission causes leakage to a receiving panel, self-interference from the UL to the DL may occur at the UE 604b-604c. If the self-interference is too large, a DL transmission failure may occur and the FD operation may not be properly performed by the UE 604b-604c. Self-interference caused by leakage from the DL to the UL may similarly occur at the base station 602a, which may result in an UL transmission failure at the base station 602a. By implementing beam separation techniques and/or beam selection techniques for one or more beam pair candidates associated with reduced self-interference (e.g., based on measurement values), the self-interference may be sufficiently reduced for performing the FD operation.

FD operations may provide a latency reduction since the UE 604b-604c and the base station 602a-602b may not have to wait for specific UL and DL slots/symbols to perform a corresponding transmission. For example, the UE 604b-604c may receive a DL signal in a FD slot/symbol or the base station 602a-602b may receive an UL signal in a FD slot/symbol to provide the latency reduction. Thus, spectral efficiency may be increased per cell and per UE since transmissions and receptions may occur at the same time and/or at a same frequency band. For subband FD transmissions, the UL and DL signals transmitted at the same time may correspond to different frequency bands (e.g., separated by a guard band), partially overlapped frequency bands, or fully overlapped frequency bands. The FD operation may be performed with reduced self-interference/leakage such that a more efficient utilisation of resources and a higher data rate is provided.

A RACH procedure may be performed in association with a FD mode (e.g., based on FDM and/or SDM) or a half-duplex (HD) mode (e.g., based on TDM). In configurations that are based on a HD RACH, a RACH message transmission such as a message (Msg) 1 (e.g., preamble) or a Msg 3 (e.g., UL payload) in a four-step RACH procedure or a Msg A (e.g., preamble and UL payload) in a two-step RACH procedure may not overlap in time with a DL transmission, where the DL transmission may be a SSB, a PDCCH, a PDSCH or a CSI-RS. A RACH message reception such as a Msg 2 (e.g., control information) or a Msg 4 (e.g., DL payload) in a four-step RACH procedure or a Msg B (e.g., control information and DL payload) in a two-step RACH procedure may not overlap in time with an UL transmission, where the UL transmission may be a PUCCH, a PUSCH or a SRS. For example, the RACH procedure may be TDMed based on the HD mode, where a RACH preamble or another RACH message may be transmitted at one time, such that the RACH procedure may not overlap in time with a SSB, a PDCCH, a PDSCH, a CSI-RS, etc., of the DL transmission. Thus, when a RACH preamble is transmitted to the base station, no transmissions may be received in the DL, as the transmissions may be per direction and per time.

The two-step RACH procedure may be based on a preamble portion and a payload portion of the Msg A or a control portion and a payload portion of the Msg B. The Msg A may be associated with an UL signal, whereas the Msg B may be associated with a DL signal. For the Msg A, the preamble portion may correspond to the Msg 1 and the payload portion may correspond to the Msg 3. For the Msg B, the control portion may correspond to the Msg 2 and the payload portion may correspond to the Msg 4. That is, the Msg 1 and the Msg 3 may be associated with an UL signal and the Msg 2 and the Msg 4 may be associated with a DL signal. The four-step RACH procedure may be based on a combination of the Msg 1, the Msg 2, the Msg 3, and the Msg 4. While some aspects described herein for exemplary purposes may be associated with Msg 1, such aspects may additionally or alternatively be associated with Msg 3. Further, the aspects described herein may be associated with Msg 2 and/or Msg 4. For example, Msg 2 and/or Msg 4 may overlap in time with an UL signal such as the PUCCH, the PUSCH, the SRS, etc., and may be FDMed or SDMed. While other aspects described herein for exemplary purposes may be associated with Msg A, such aspects may additionally or alternatively be associated with Msg B. For example, Msg B may overlap in time with an UL signal such as the PUCCH, the PUSCH, the SRS, etc., and may be FDMed or SDMed.

For FD mode, a RACH message may overlap in time with a DL transmission, such as the SSB, PDCCH, PDSCH, CSI-RS, etc., to increase system efficiencies and reduce latency. For example, a SSB associated with a fixed resource allocation may overlap in time with a pre-allocation for a RACH message. Types of FD RACHs may include a FDMed RACH, a SDMed RACH, or a combination of the FDMed RACH and the SDMed RACH. The FDMed RACH, which may be associated with an UL transmission, may share the same time resources as a DL transmission but may correspond to different frequency resources (e.g., separated by a guard band) or partially different frequency resources than the DL transmission. For example, the DL transmission may utilize frequency bands 1, 2, and 3 and the UL transmission for the RACH may utilize frequency bands 2, 3, and 4. The SDMed RACH, which may likewise be associated with an UL transmission, may share the same time and frequency resources as the DL transmission. Thus, the UL transmission and the DL transmission may be overlapped in time and frequency and may rely on a spatial dimension to separate the transmissions. Such separation may be based on physical separation and/or directions of the UL and DL beams. Both the FDMed RACH and the SDMed RACH may be associated with FD operations since DL transmissions may be received by the UE 604b-604c and/or transmitted by the base station 602a-602b simultaneously with the RACH message.

Different RACH parameters may be configured via RRC signaling from the base station 602a-602c to the UE 604a-604c for the RACH procedure. The different RACH parameters may include one or more of a prach-ConfigurationIndex, preambleReceivedTargetPower, rsrp-ThresholdSSB, rsrp-ThresholdCSI-RS, rsrp-ThresholdSSB-SUL, candidateBeamRSList, recoverySearchSpaceId, powerRampingStep, powerRampingStepHighPriority, scalingFactorBI, ra-PreambleIndex, ra-ssb-OccasionMaskIndex, ra-OccasionList, ra-PreambleStartIndex, preambleTransMax, ssb-perRACH-OccasionAndCB-PreamblesPerSSB, amongst other parameters.

The prach-ConfigurationIndex parameter may correspond to an index for an available set of physical RACH (PRACH) occasions for transmission of a random access preamble. The preambleReceivedTargetPower parameter may correspond to an initial random access preamble power. The rsrp-ThresholdSSB parameter may correspond to a RSRP threshold for selection of the SSB. If the random access procedure is initiated for beam failure recovery (BFR), the rsrp-ThresholdSSB parameter may be used for selection of the SSB from a candidateBeamRSList, which may correspond to a rsrp-ThresholdSSB of a BeamFailureRecoveryConfig information element (IE). That is, a SSB received by the UE 604b-604c may be used for transmitting the RACH preamble. The rsrp-ThresholdCSI-RS parameter may correspond to a RSRP threshold for selection of CSI-RS. If the random access procedure is initiated for BFR, the rsrp-ThresholdCSI-RS parameter may be equal to the rsrp-ThresholdSSB parameter of the BeamFailureRecoveryConfig IE. The rsrp-ThresholdSSB-SUL parameter may correspond to a RSRP threshold for selection of either a normal uplink (NUL) carrier or a supplementary uplink (SUL) carrier. The candidateBeamRSList parameter may correspond to a list of reference signals (e.g., CSI-RS and/or SSB) for identifying a candidate beams for recovery and associated random access parameters. The recoverySearchSpaceId parameter may correspond to a search space identity for monitoring for a response of the beam failure recovery (BFR) request. The powerRampingStep parameter may correspond to a power-ramping factor. The powerRampingStepHighPriority parameter may correspond to the power-ramping factor in instances of prioritized random access procedures. The scalingFactorBI parameter may correspond to a scaling factor for the prioritized random access procedure. The ra-PreambleIndex parameter may correspond to a random access preamble. The ra-ssb-OccasionMaskIndex parameter may define one or more PRACH occasions associated with the SSB, where the MAC may transmit the random access preamble. The ra-OccasionList parameter may define one or more PRACH occasions associated with a CSI-RS, where the MAC may transmit the random access preamble. The ra-PreambleStartIndex parameter may correspond to a starting index of one or more random access preambles for an on-demand system information (SI) request. The preambleTransMax parameter may correspond to a maximum number of random access 9reamble transmissions. The ssb-perRACH-OccasionAndCB-PreamblesPerSSB parameter may define a number of SSBs that are mapped to each PRACH occasion and a number of contention-based random access preambles that are mapped to each SSB. One or more of the above-noted parameters and/or other parameters may be signaled to the UE 604a-604c by the base station 602a-602c.

In a first aspect, the base station 602a-602c may configure different sets of RACH parameters (e.g., three different parameters sets, as opposed to one parameter set) to the UE 604a-604c based on RRC signaling. The UE 604a-604c may use some or all of the parameters for a RACH transmission in the HD mode and some or all of the parameters for a RACH transmission in the FD mode, which may be different parameters. The parameter sets may be different for a two-step RACH procedure and a four-step RACH procedure. For example, three parameter sets may correspond to the two-step RACH procedure and three parameter sets may correspond to the four-step RACH procedure, which may correspond to six total parameters sets. The three parameter sets may include parameters for each of TDMed RACH procedures (e.g., HD RACH), FDMed RACH procedures (e.g., FD RACH), and SDMed RACH procedures (e.g., FD RACH). The parameters configured for each of the different parameter sets may include different values for an initial random access preamble power, a power ramping procedure, a maximum number of preamble transmissions, a RSRP SSB threshold, a RSRP CSI-RS threshold, etc.

For HD RACH procedures of the UE 606, the RACH preamble may be transmitted by the UE 606 at a full power. However, for FD RACH procedures of the UE 604b-604c, where the UE 604b-604c is operating in the FD mode, the transmission power at the UE transmitter may be decreased to limit self-interference to the UE receiver. In another example, to receive the RACH preamble at a base station 602a-602b, where the base station is operating in the FD mode, the UE 604b/606 may increase the transmission power to strengthen the UL transmission being received by the base station 602a-602b, as a receiving panel of the base station 602a-602b may receive a level of self-interference from the transmission panel of the base station 602a-602b via a simultaneous DL transmission. Thus, the transmission power for the RACH preamble may be different for different configurations of the UE 604a-604c and the base station 602a-602c. Therefore, other than the transmission types of the RACH, the parameter sets may also depend on whether the UE or the base station or both is operating in the FD mode. In such cases, for example, more than three parameter sets may correspond to the two-step RACH procedure and more than three parameter sets may correspond to the four-step RACH procedure.

The power ramping procedure may also be different for various transmissions, as the power ramping procedure may correspond to an increase in power for the RACH preamble transmission. The maximum number of preamble transmissions/retransmissions may be based on whether the UE 604a-604c and/or base station 602a-602c is operating in the HD mode or the FD mode. For HD RACH procedures, the UE 606 may be configured to perform a lower number of retransmissions and for FD RACH procedures the UE 604b-604c may be configured to perform a higher number of retransmissions.

In a second aspect, the base station 602a-602c may configure a common set of RACH parameters, where the same parameters are used for different RACH transmission types (e.g., TDM, FDM, SDM), as well as different subsets of RACH parameters (e.g., three different subsets), where the parameter sets for each of the different subsets are different (e.g., three parameters sets for two-step RACH and three sets for four-step RACH). For instance, each two-step RACH procedure may be associated with a common set of RACH parameters and three different subsets of RACH parameters and each four-step RACH procedure may be associated with an additional common set of RACH parameters and three different subsets of RACH parameters.

At least one parameter in each parameter set of the different parameter sets may be different from the parameters of the other parameter sets of the different parameter sets. In an example where the UE 604b-604c is operating in a FD mode, a low transmission power may be used for transmitting the RACH preamble in association a SDMed RACH procedure. Since the UE 604b-604c is operating in the FD mode and may receive a DL reception from the base station 602b-602c, using a high transmission power for the RACH preamble may generate too much self-interference at the UE 604b-604c for successfully receiving the DL reception. Thus, the base station 602b-602c may configure the UE 604b-604c based on a low transmission power. For FDMed RACH procedures, the preamble transmission power may be higher than the transmission used in association with the SDMed RACH procedure, as the FDMed RACH procedure may include a separation in frequency (e.g., based on a guard band located between UL and DL frequency bands). For instance, the self-interference caused by the FDMed RACH procedure may be less than the self-interference caused by the SDMed RACH procedure, thereby allowing the UE 604b-604c to utilize a higher transmission power for the RACH preamble. For TDMed RACH procedures, the preamble transmission power may be further increased (e.g., to a highest power/full power of the UE 606), as self-interference may not occur based on the UE 606 operating in the HD mode. Interference to the UE 606 while operating in the HD mode may be limited to background noise and/or other external forms of interference.

In an example where the base station 602a-602b is operating in the FD mode, a high transmission power may be used by the UE 604b/606 in association with the SDMed RACH procedure for the base station 602a-602b to receive the RACH preamble from the UE 604b/606. Since the base station 602a-602b is operating in the FD mode and may transmit a DL transmission to the UE 604a-604b while the RACH preamble is being received by the base station 602a-602b, the UL signal strength corresponding to the RACH preamble may need to overcome the leakage caused by the DL transmission that may self-interfere with reception of the RACH preamble. Thus, the transmission power of the RACH preamble may correspond to a high transmission power. For FDMed RACH procedures, the preamble transmission power may be lower than the transmission used in association with the SDMed RACH procedure, as the FDMed RACH procedure may include a separation in frequency (e.g., based on a guard band located between UL and DL frequency bands). The separation in frequency may cause a lower self-interference at the base station 602a-602b, thereby allowing the RACH preamble to be transmitted at a lower power level. For TDMed RACH procedures, the preamble transmission power may be further decreased by the UE 604c, as self-interference may not occur at the base station 608 based on the base station 608 operating in the HD mode. Accordingly, the configuration of the different sets of RACH parameters may depend on the RACH transmission type being implemented (e.g., TDM, FDM, SDM) and whether the UE 604a-604c and/or the base station 602a-602c is operating in the FD mode.

While different configurations for the RACH preamble transmission power are described above as examples, other parameters of the different RACH parameters may be adapted based on similar considerations. For example, each parameter set may include a different power ramping parameter or each parameter set may include a different rsrp-ThresholdSSB/CSI-RS parameter, where different thresholds may be utilized for receiving a SSB or CSI-RS based on whether the UE 604a-604c and/or base station 602a-602c is operating in the FD mode or the HD mode. Instead of configuring the UE 604a-604c based on the rsrp-ThresholdSSB/CSI-RS parameter, the configuration may be based on the new sinr-ThresholdSSB/CSI-RS parameter or other parameter. In the FD Mode, the power of the SSB may be measured in comparison to the self-interference to determine whether a beam may be used for the FD RACH or whether the beam may fail as a result of the self-interference. A SINR may be a parameter for measuring the SSB/CSI-RS instead of performing the measurement based on a RSRP.

After the different sets of RACH parameters are determined, the base station 602a-602c may signal the configurations for the different sets of RACH parameters to UE 604a-604c. The signaling may be based on a RRC message for a connected mode of operation. For example, RRC signaling may be used to transmit three different sets of RACH parameter configurations to the UE 604a-604c. The signaling may be based on remaining minimum system information (RMSI) for a broadcasting mode of operation.

The UE 604b-604c/606 may determine a type of the RACH transmission (e.g., TDM, FDM, SDM) in association with the HD mode and the FD mode. In a first aspect, the UE 604b-604c/606 may independently determine the type of the RACH transmission. For example, the UE 604b-604c/606 may determine to use a latest RACH occasion for transmitting the RACH preamble, which may be TDMed, FDMed, or SDMed.

In a second aspect, the UE 604b-604c/606 may determine the type of the RACH transmission based on a SINR or based on a RSRP of a SSB or CSI-RS. The base station 602a-602c may configure different SSB or CSI-RS thresholds per RACH type based on different parameters for the different RACH types. For example, a UE 606 having a measured DL RSRP that is low may utilize a TDMed HD RACH. A UE 604b-604c having a measured DL RSRP that is high may utilize a FDMed FD RACH or, for an even higher DL RSRP, the UE 604b-604c may utilize a SDMed FD RACH. More specifically, power limited UEs such as for URLLC (e.g., that may be further away from the base station 602a-602c) may utilize the TDMed HD RACH to increase a likelihood that the UL transmission is received by the base station 602a-602c, whereas non-power limited UEs (e.g., that may be closer to the base station 602a-602c) may utilize the FDMed or SDMed FD RACH.

In a third aspect, the UE 604b-604c/606 may determine the type of RACH transmission based on a priority indication. For example, the base station 602a-602c may include a priority field in the RACH configuration after the UE 604b-604c/606 is connected to the network. The priority field may indicate a traffic type of the RACH transmission, which may correspond to a BFR and/or a timing advance (TA) of the RACH transmission. A higher priority UE 606 may utilize a TDMed HD RACH transmission to provide an increased likelihood of a successful transmission to the base station 602a. A lower priority UE 604b-604c may utilize a FDMed FD RACH or a SDMed FD RACH. Thus, for non-initial access (e.g., where the UE 604b-604c/606 is operating in the connected mode), the UE 604b-604b/606 may determine the type of RACH based on an indication of a PHY priority field from the base station 602a-602c.

For initial access, the UE 604b-604b/606 may determine the priority of the RACH transmission based on a priority of a subscripted service class of the UE 604b-604b/606, which may be determined via a UE profile (e.g., included on a subscriber identity module (SIM) card). The determination of priority of the subscripted service class may be based on a predefined protocol. A higher priority UE 606 may utilize a TDMed HD RACH transmission to provide an increased likelihood of a successful initial access transmission to the base station 602a. A lower priority UE 604b-604c may utilize a FDMed FD RACH or a SDMed FD RACH.

In a fourth aspect, the UE 604b-604b/606 may determine the priority of the RACH transmission based on a purpose of the RACH procedure. For example, if the purpose of the RACH transmission is for initial access, which may be of higher priority, the UE 606 may utilize a TDMed HD RACH to increase the likelihood of a successful connection with the cell. If the purpose of the RACH transmission is for BFR or a new TA request, the UE 604b-604c may utilize a SDMed FD RACH or a FDMed FD RACH, as BFR and TA may be of lesser priority than initial access. The determination of priority of the purpose of the RACH transmission may be based on a predefined protocol or indicated by the base station 602a-602c via a RMSI message or a SIB message transmitted to the UE 604b-604b/606.

In a fifth aspect, the UE 604b-604b/606 may determine the priority of the RACH transmission based on a number of attempted retransmissions of the RACH transmission. For example, an initial RACH transmission may be based on a SDMed FD RACH or a FDMed FD RACH. If after N retransmissions the RACH is still not successfully received by the base station 602b/608, the UE 604b-604c may switch the type of the RACH transmission from the SDMed/FDMed FD RACH to a TDMed HD RACH. The determination to switch the type of the RACH transmission may be based on a predefined protocol or indicated by the base station 602b-602c via a RMSI message, a SIB message, or other DL signal transmitted to the UE 604b-604c.

The base station 602a-602c may provide a configuration for activation/deactivation of the RACH transmission based on lower layer signaling. For example, the base station 602a-602c may configure the activation/deactivation of the RACH transmission via MAC-control element (MAC-CE) or DCI. The configuration may be received by the UE 604b-604c/606 while the UE 604b-604c/606 is in the connected mode. The base station 602a-602c may determine to deactivate the RACH transmission to increase the likelihood of a successful reception of a DL transmission from the base station 602a-602c (e.g., DL transmissions have a higher priority than the RACH transmission). The RACH may be pre-allocated/pre-configured based on certain symbols. Thus, scheduling flexibility may be provided to the base station 602a-602c via a RACH activation/deactivation mechanism, as transmission of the FD RACH may cause a failure of the DL transmission. If the RACH transmission is deactivated during such symbols, the DL transmission may be received by the UE 604a-604c without self-interference from the RACH transmission in the UL. For example, URLLC transmissions in the DL may be associated with a higher reliability and a shorter latency than RACH transmissions of the UE 604a-604b/606. Thus, the RACH transmission may be deactivated/disabled during such DL transmission symbols to increase the likelihood that the URLLC transmission is received by the UE 604a-604c.

Figure 7:
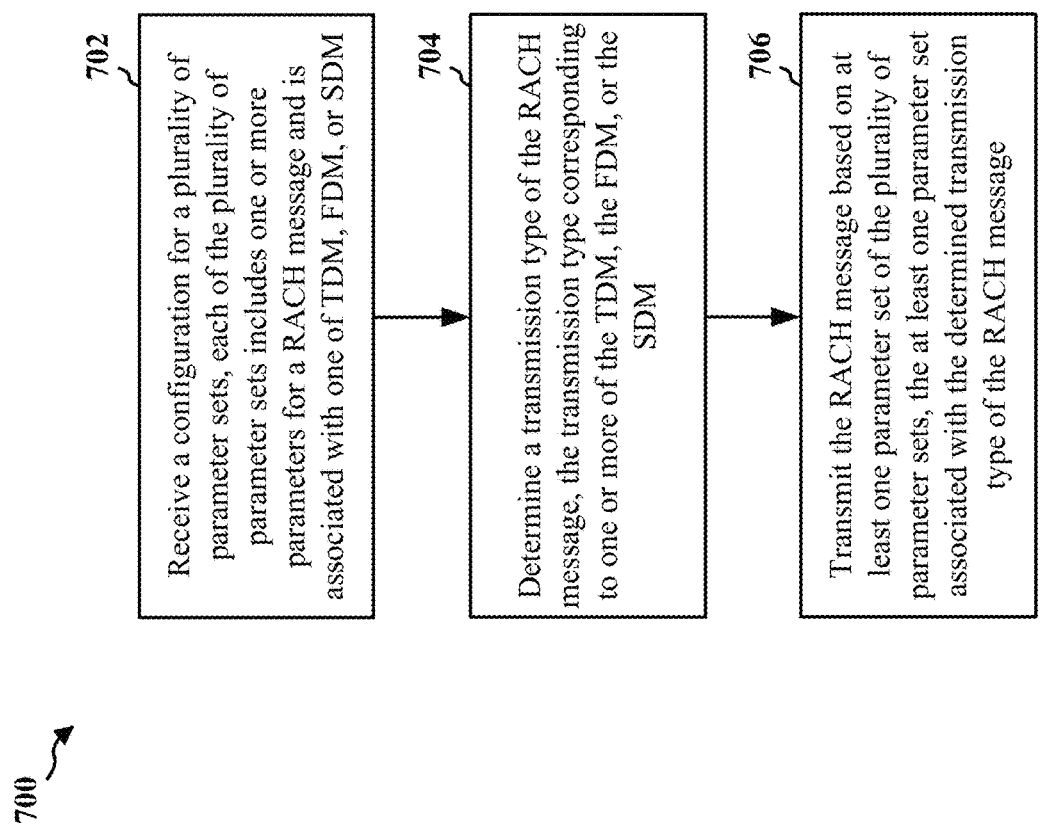
FIG. 7 is a flowchart of a method of wireless communication of a UE.

FIG. 7 is a flowchart 700 of a method of wireless communication. The method may be performed by a UE (e.g., the UE 104, 402, 502, 604a-604c, 606; the apparatus 1102; etc.), which may include the memory 360 and which may be the entire UE 104, 402, 502, 604a-604c, 606 or a component of the UE 104, 402, 502, 604a-604c, 606, such as the TX processor 368, the RX processor 356, and/or the controller/processor 359.

At 702, the UE may receive a configuration for a plurality of parameter sets, each of the plurality of parameter sets includes one or more parameters for a RACH message and is associated with one of TDM, FDM, or SDM. For example, referring to FIGS. 4 and 6A-6C, the UE 402 may receive, at 406a, a RACH parameter configuration from the base station 404 for a TDM/FDM/SDM RACH message transmission. Similarly, the UE 604b-604c/606 may receive a RACH configuration for parameter sets from the base station 602a-602c. The configuration for the plurality of parameter sets (e.g., parameter set configuration 406b) may correspond to different parameter sets of the plurality of parameter sets for each of the TDM, the FDM, and the SDM; or the configuration for the plurality of parameter sets (e.g., parameter set configuration 406b) may correspond to a common parameter set of the plurality of parameter sets for the TDM, the FDM, and the SDM and different parameter sets of the plurality of parameter sets for each of the TDM, the FDM, and the SDM. In either case, the different parameter sets may include a first set of parameter sets associated with a two-step RACH procedure and a second set of parameter sets associated with a four-step RACH procedure. For example, the parameter set configuration 406b may include 3 parameter sets for 2-step RACH and 3 parameter sets for 4-step RACH. The different parameter sets (e.g., of the parameter set configuration 406b) may be based on different values of the one or more parameters for each of the TDM, the FDM, and the SDM. In aspects, the one or more parameters (e.g., of the parameter set configuration 406b) may include a SINR threshold for at least one of a SSB or a CSI-RS. The configuration for the plurality of parameter sets for the RACH message may be received, at 406a, by the UE 402 in a connected mode via RRC signaling, or the configuration for the plurality of parameter sets for the RACH message may be received, at 406a, by the UE 402 in a broadcast mode via RMSI.

At 704, the UE may determine a transmission type of the RACH message, the transmission type corresponding to one or more of the TDM, the FDM, or the SDM. For example, referring to FIG. 4, the UE 402 may determine, at 408, a RACH transmission type (e.g., TDM/FDM/SDM).

At 706, the UE may transmit the RACH message based on at least one parameter set of the plurality of parameter sets, the at least one parameter set associated with the determined transmission type of the RACH message. For example, referring to FIGS. 4 and 6A-6C, the UE 402 may transmit, at 410, the RACH message based on the parameter set and the determined transmission type. Similarly, the UE 604b-604c/606 may transmit the UL RACH message to the base station 602a-602b/608 via TDM/FDM/SDM based on the RACH configuration received from the base station 602a-602c.

Figure 8:
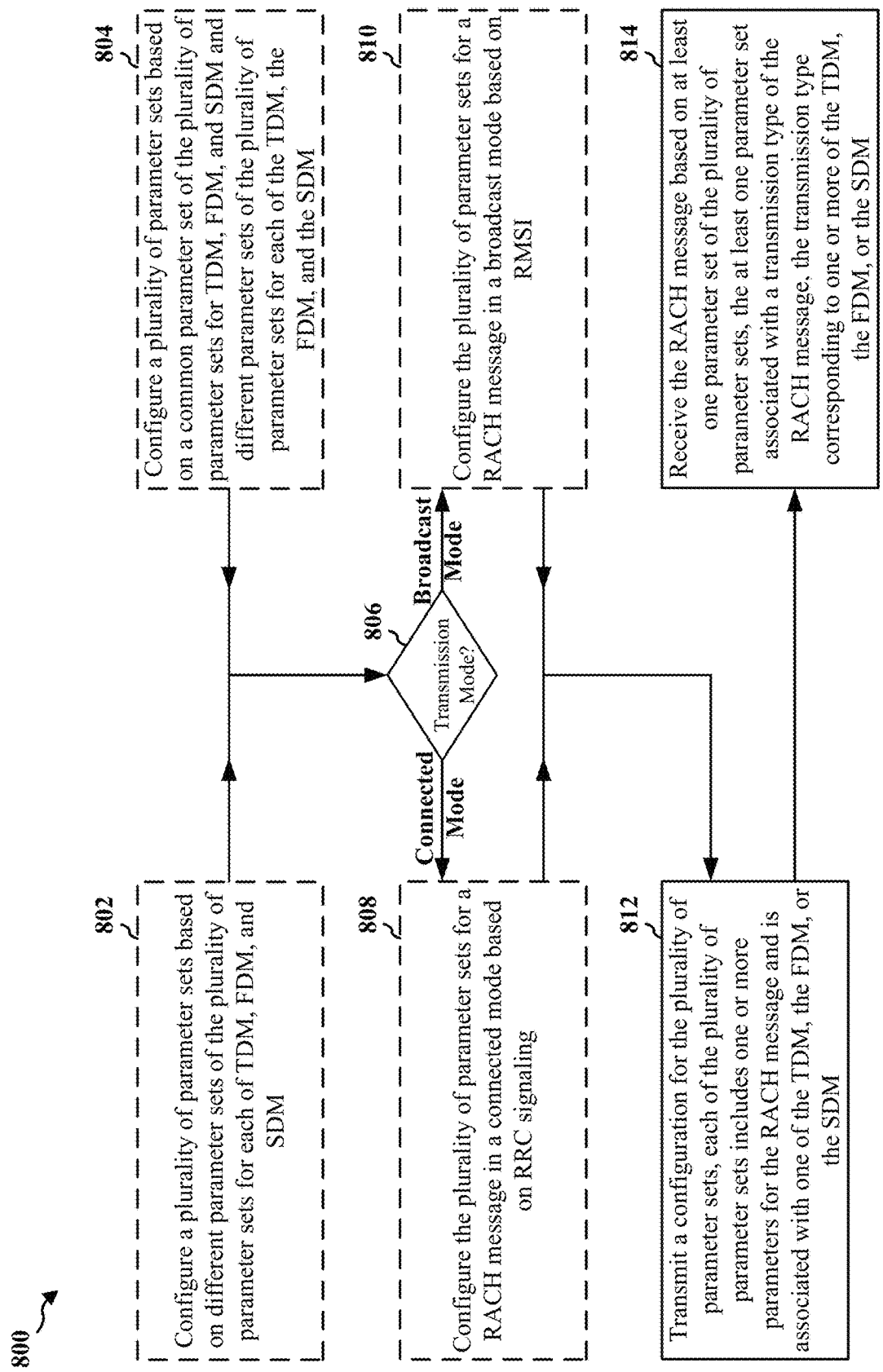
FIG. 8 is a flowchart of a method of wireless communication of a base station.

FIG. 8 is a flowchart 800 of a method of wireless communication. The method may be performed by a base station (e.g., the base station 102, 402, 502, 602a-602c, 608; the apparatus 1202; etc.), which may include the memory 376 and which may be the entire base station 102, 402, 502, 602a-602c, 608 or a component of the base station 102, 402, 502, 602a-602c, 608, such as the TX processor 316, the RX processor 370, and/or the controller/processor 375.

At 802, the base station may configure a plurality of parameter sets based on different parameter sets of the plurality of parameter sets for each of TDM, FDM, and SDM. For example, referring to FIG. 4, the base station 404 may configure via the parameter set configuration 406b all different parameter sets for TDM/FDM/SDM. The different parameter sets (e.g., of the parameter set configuration 406b) may include a first set of parameter sets associated with a two-step RACH procedure and a second set of parameter sets associated with a four-step RACH procedure. For example, the parameter set configuration 406b may include 3 parameter sets for 2-step RACH and 3 parameter sets for 4-step RACH. The different parameter sets (e.g., of the parameter set configuration 406b) may be based on different values of the one or more parameters for each of the TDM, the FDM, and the SDM.

At 804, the base station may alternatively configure a plurality of parameter sets based on a common parameter set of the plurality of parameter sets for TDM, FDM, and SDM and different parameter sets of the plurality of parameter sets for each of the TDM, the FDM, and the SDM. For example, referring to FIG. 4, the base station 404 may configure via the parameter set configuration 406b at least one common parameter set for TDM/FDM/SDM and different parameter subsets for each of TDM/FDM/SDM. The different parameter sets (e.g., of the parameter set configuration 406b) may include a first set of parameter sets associated with a two-step RACH procedure and a second set of parameter sets associated with a four-step RACH procedure. For example, the parameter set configuration 406b may include 3 parameter sets for 2-step RACH and 3 parameter sets for 4-step RACH.

At 806, the base station 404/602a-602c may determine whether a transmission mode of the configuration (e.g., parameter set configuration 406b) for the plurality of parameter sets corresponds to a connected mode or a broadcast mode.

At 808, if the transmission mode corresponds to the connected mode, the base station may configure the plurality of parameter sets for a RACH message in the connected mode based on RRC signaling. For example, referring to FIG. 4, the base station 404 may utilize RRC signaling to configure the RACH parameters in the connected mode.

At 810, if the transmission mode corresponds to the broadcast mode, the base station may configure the plurality of parameter sets for a RACH message in the broadcast mode based on RMSI. For example, referring to FIG. 4, the base station 404 may utilize RMSI to configure the RACH parameters in the broadcast mode.

At 812, based on either the connected mode or the broadcast mode, the base station may transmit a configuration for the plurality of parameter sets, each of the plurality of parameter sets includes one or more parameters for the RACH message and is associated with one of the TDM, the FDM, or the SDM. For example, referring to FIGS. 4 and 6A-6C, the base station 404 may transmit, at 406a, a RACH parameter set configuration to the UE 402. The base station 602a-602c may similarly transmit a RACH configuration to the UE 604b-604c/606. The one or more parameters (e.g., included in parameter set configuration 406b/RACH configuration) may include a SINR threshold for at least one of a SSB or a CSI-RS.

At 814, the base station may receive the RACH message based on at least one parameter set of the plurality of parameter sets, the at least one parameter set associated with a transmission type of the RACH message, the transmission type corresponding to one or more of the TDM, the FDM, or the SDM. For example, referring to FIGS. 4 and 6A-6C, the base station 404 may receive, at 410, the RACH message based on the parameter set and the determined transmission type (e.g., TDM/FDM/SDM). Similarly, the base station 602a-602b/608 may receive the UL RACH message from the UE 604b-604c/606 based on the parameter sets of the RACH configuration via TDM/FDM/SDM.

Figure 9:
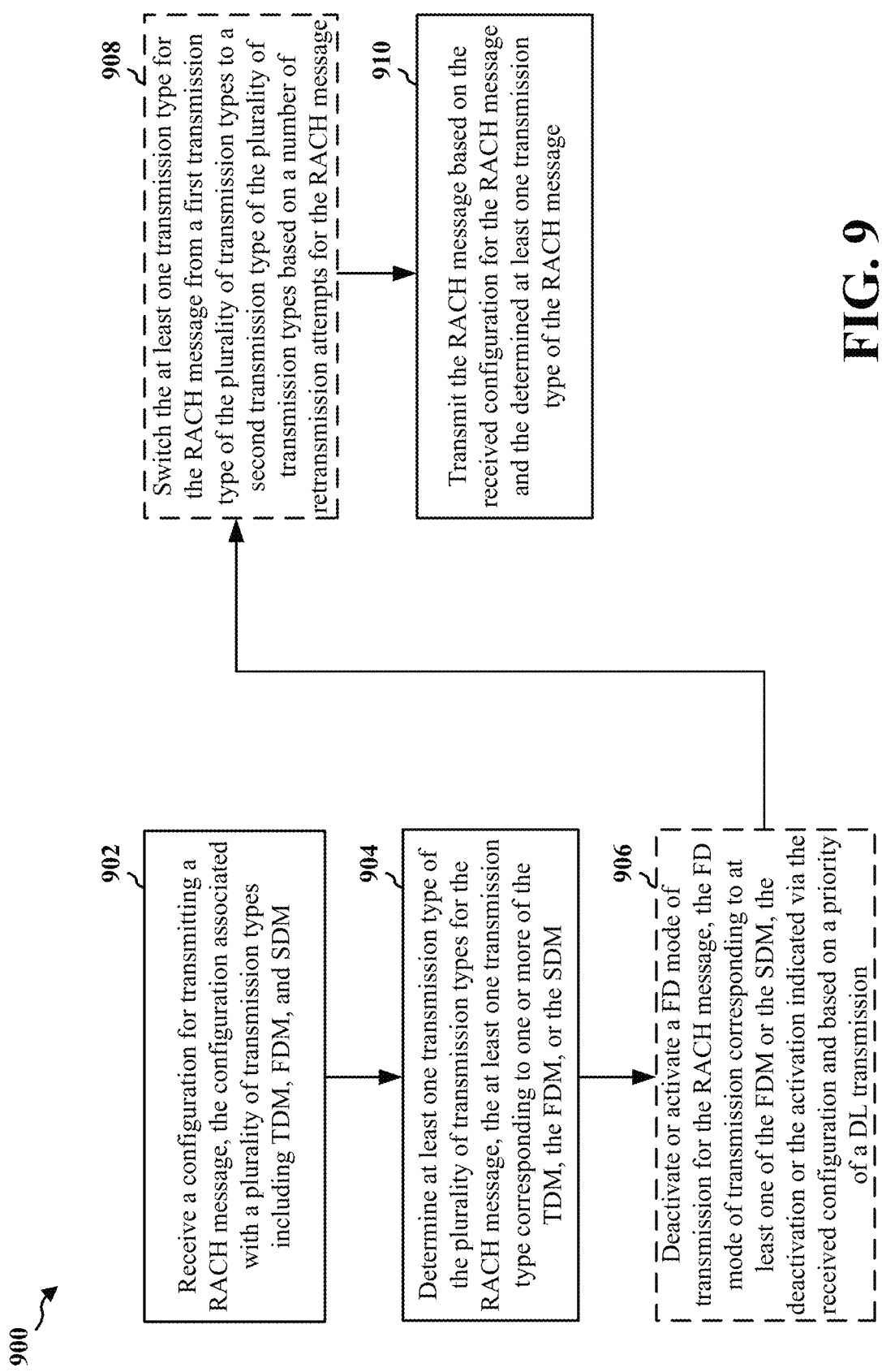
FIG. 9 is a flowchart of a method of wireless communication of a UE.

FIG. 9 is a flowchart 900 of a method of wireless communication. The method may be performed by a UE (e.g., the UE 104, 402, 502, 604a-604c, 606; the apparatus 1302; etc.), which may include the memory 360 and which may be the entire UE 104, 402, 502, 604a-604c, 606 or a component of the UE 104, 402, 502, 604a-604c, 606, such as the TX processor 368, the RX processor 356, and/or the controller/processor 359.

At 902, the UE may receive a configuration for transmitting a RACH message, the configuration associated with a plurality of transmission types including TDM, FDM, and SDM. For example, referring to FIGS. 5-6C, the UE 502 may receive, at 506, a RACH message configuration from the base station 504. Similarly, the UE 604b-604c/606 may receive a RACH configuration from the base station 602a-602c for a transmission type selection (e.g., TDM/FDM/SDM).

At 904, the UE may determine at least one transmission type of the plurality of transmission types for the RACH message, the at least one transmission type corresponding to one or more of the TDM, the FDM, or the SDM. For example, referring to FIG. 5, the UE 502 may determine, at 508a, a RACH transmission type (e.g., TDM/FDM/SDM) based on determination protocols 508b. In a first aspect, the at least one transmission type for the RACH message may be determined, at 508a, based on a latest occasion of the transmission type for the RACH message (e.g., UE-determined in accordance with the determination protocols 508b). In a second aspect, the at least one transmission type may be determined, at 508a, based on at least one of a measurement value for a RSRP of a SSB or a CSI-RS, or a measurement value of a SINR of the SSB or the CSI-RS (e.g., RSRP-based/SINR-based in accordance with the determination protocols 508b). In a third aspect, the configuration (e.g., received at 506) may include a priority indication for the RACH message, where the at least one transmission type may be determined, at 508a, based on the priority indication (e.g., priority-based in accordance with the determination protocols 508b). The priority indication may correspond to a priority of a subscribed service class of the UE 502. In a fourth aspect, the at least one transmission type may be determined, at 508a, based on a purpose of the RACH message (e.g., purpose-based in accordance with the determination protocols 508b), where the purpose may correspond to at least one of an initial access, a BFR, or a TA order. The initial access may be associated with the TDM and each of the BFR and the TA order may be associated with at least one of the FDM or the SDM. In a fifth aspect, the at least one transmission type may be determined, at 508a, based on a number of retransmission attempts for the RACH message (e.g., multi-attempt-based in accordance with the determination protocols 508b).

At 906, the UE may deactivate or activate a FD mode of transmission for the RACH message, the FD mode of transmission corresponding to at least one of the FDM or the SDM, the deactivation or the activation indicated via the received configuration and based on a priority of a DL transmission. For example, referring to FIG. 5-6C, the UE 502 may activate/deactivate, at 510, the FD mode of the UE 502. For example, the FD activation/deactivation may be indicated in the RACH message configuration received, at 506, based on a DL transmission priority. The UE 604b-604c may be configured in the FD mode to transmit the UL RACH message to the base station 602b/608 based on FDM/SDM. The UE 606 may be configured in the HD mode to transmit the UL RACH message to the base station 602a based on TDM.

At 908, the UE may switch the at least one transmission type for the RACH message from a first transmission type of the plurality of transmission types to a second transmission type of the plurality of transmission types based on a number of retransmission attempts for the RACH message. For example, referring to FIG. 5, the UE 502 may switch, at 512, the FDM/SDM to TDM via the multi-attempt-based protocol of the determination protocols 508b.

At 910, the UE may transmit the RACH message based on the received configuration for the RACH message and the determined at least one transmission type of the RACH message. For example, referring to FIG. 5, the UE 502 may transmit, at 514, the RACH message based on the received configuration and the determined transmission type. Similarly, the UE 604b-604c/606 may transmit the UL RACH message via TDM/FDM/SDM to the base station 602a-602b/608 based on the RACH configuration received from the base station 602a-602c/608.

Figure 10:
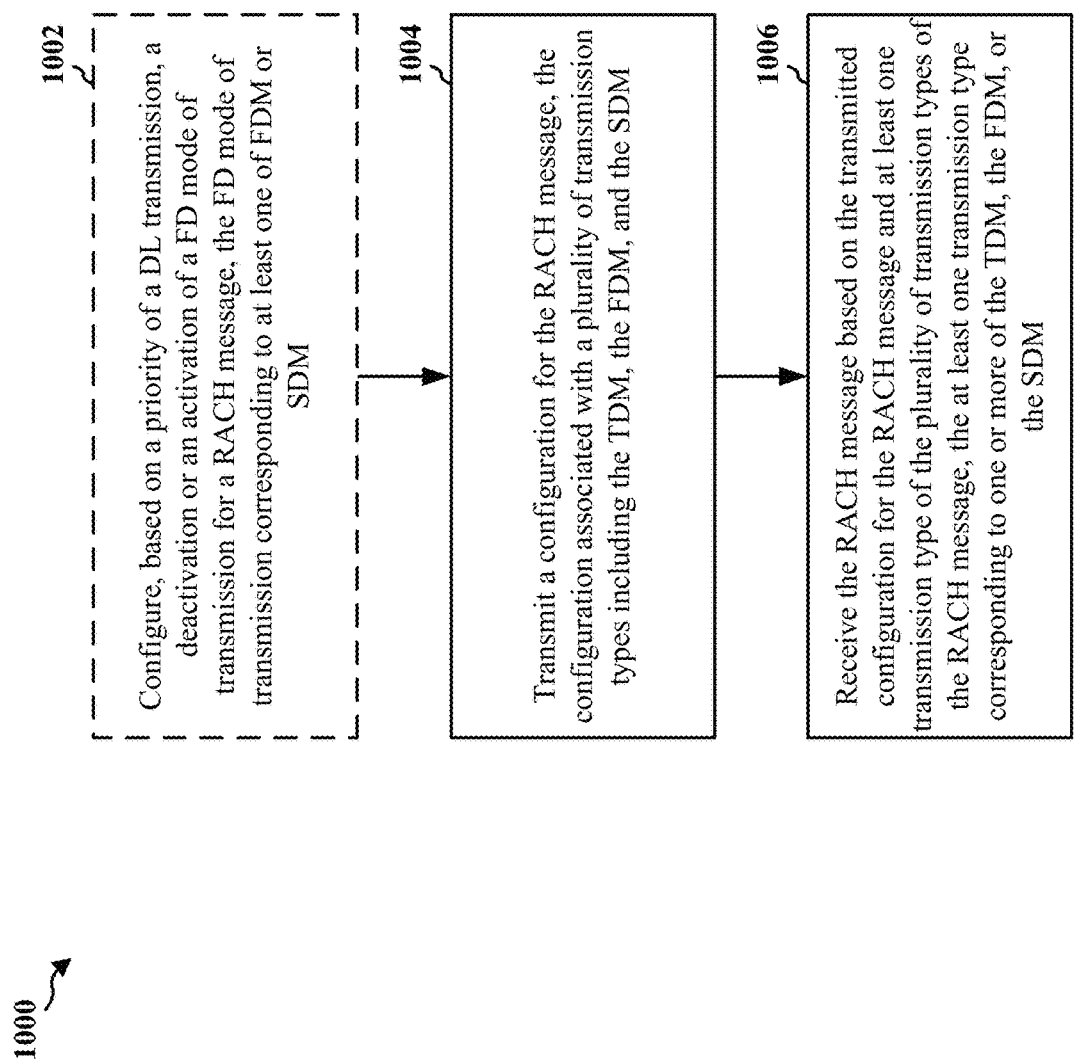
FIG. 10 is a flowchart of a method of wireless communication of a base station.

FIG. 10 is a flowchart 1000 of a method of wireless communication. The method may be performed by a base station (e.g., the base station 102, 402, 502, 602a-602c, 608; the apparatus 1402; etc.), which may include the memory 376 and which may be the entire base station 102, 402, 502, 602a-602c, 608 or a component of the base station 102, 402, 502, 602a-602c, 608, such as the TX processor 316, the RX processor 370, and/or the controller/processor 375.

At 1002, the base station may configure, based on a priority of a DL transmission, a deactivation or an activation of a FD mode of transmission for a RACH message, the FD mode of transmission corresponding to at least one of FDM or SDM. For example, referring to FIGS. 5-6C, the base station 504 may configure a FD activation/deactivation of the UE 502 based on a DL transmission priority. The UE 604b-604c may transmit the UL RACH message to the base station 602b/608 in the FD mode via FDM/SDM. The UE 606 may transmit the UL RACH message to the base station 602a in the HD mode via TDM.

At 1004, the base station may transmit a configuration for the RACH message, the configuration associated with a plurality of transmission types including the TDM, the FDM, and the SDM. For example, referring to FIGS. 5-6C, the base station 504 may transmit, at 506, the RACH message configuration to the UE 502 trigger an UL RACH transmission based on TDM/FDM/SDM. Similarly, the base stations 602a-602c/608 may transmit a RACH configuration to the UE 604a-604c/606.

At 1006, the base station may receive the RACH message based on the transmitted configuration for the RACH message and at least one transmission type of the plurality of transmission types of the RACH message, the at least one transmission type corresponding to one or more of the TDM, the FDM, or the SDM. For example, referring to FIGS.

5-6C, the base station 504 may receive, at 514, the RACH message from the UE 502 based on the transmitted configuration and a corresponding transmission type (e.g., TDM/FDM/SDM). Similarly, the base station 602a-602b/608 may receive the UL RACH message from the UE 604b-604c/606 via TDM/FDM/SDM. In a first aspect, the at least one transmission type for the RACH message may be based on a latest occasion of the transmission type for the RACH message (e.g., UE-determined in accordance with the determination protocols 508b). In a second aspect, the at least one transmission type may be based on at least one of a measurement value for a RSRP of a SSB or a CSI-RS, or a measurement value of a SINR of the SSB or the CSI-RS (e.g., RSRP-based/SINR-based in accordance with the determination protocols 508b). In a third aspect, the configuration (e.g., transmitted at 506) may include a priority indication for the RACH message, where the at least one transmission type may be based on the priority indication (e.g., priority-based in accordance with the determination protocols 508b). The priority indication may correspond to a priority of a subscribed service class of the UE 502 to which the configuration is transmitted, at 506. In a fourth aspect, the at least one transmission type may be based on a purpose of the RACH message (e.g., purpose-based in accordance with the determination protocols 508b), where the purpose may correspond to at least one of an initial access, a BFR, or a TA order. The initial access may be associated with the TDM and each of the BFR and the TA order may be associated with at least one of the FDM or the SDM. In a fifth aspect, the RACH message may be received, at 514, based on a second transmission type of the plurality of transmission types (e.g., at least one of the FDM or the SDM), where the at least one transmission type may be switched to the second transmission type (e.g., the at least one of the FDM or the SDM) from a first transmission type of the plurality of transmission types (e.g., the TDM) based on a threshold number of retransmission attempts for the RACH message (e.g., multi-attempt-based in accordance with the determination protocols 508b).

Figure 11:
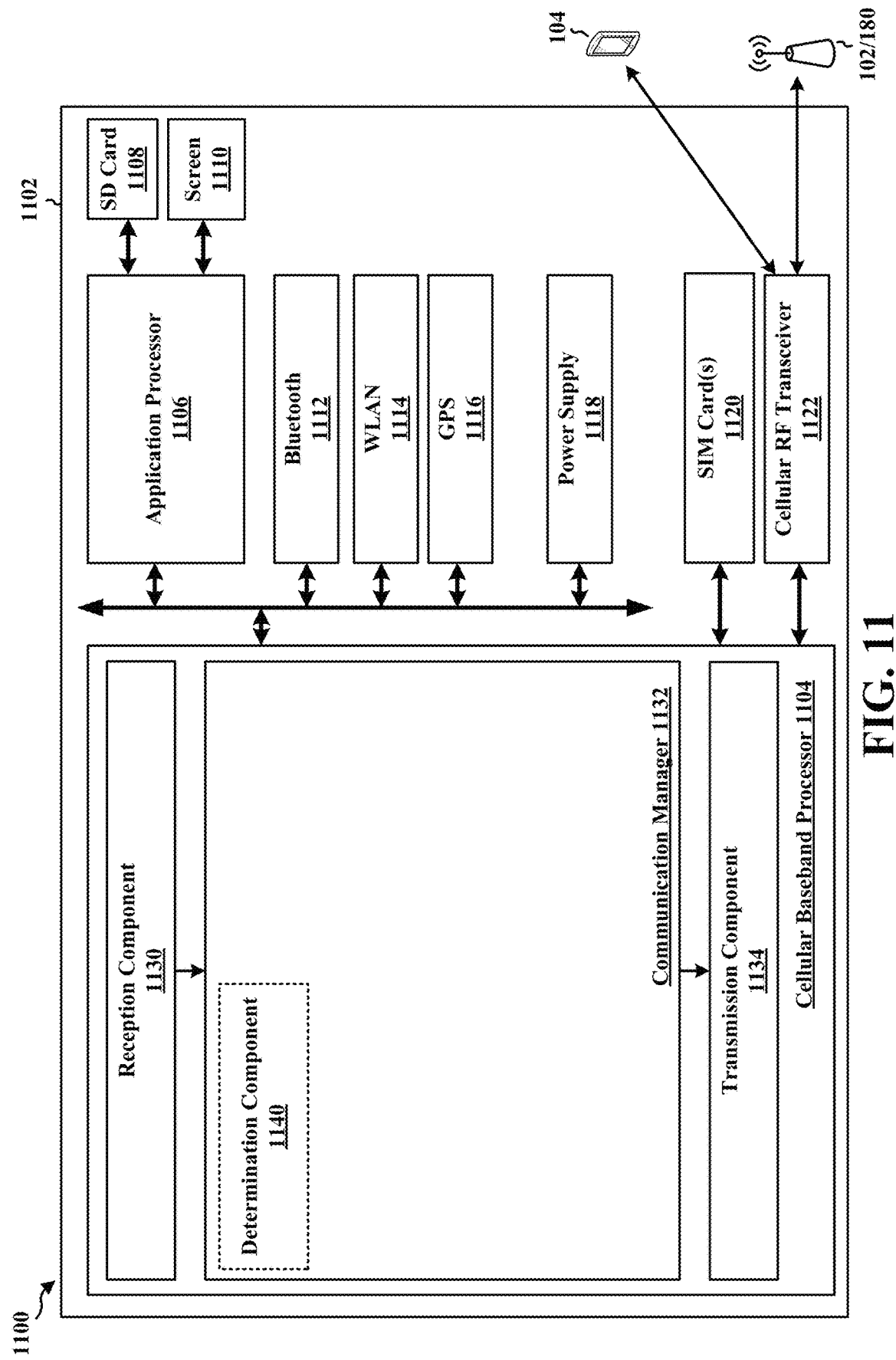
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more SIM cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The reception component 1130 is configured, e.g., as described in connection with 702, to receive a configuration for a plurality of parameter sets, each of the plurality of parameter sets includes one or more parameters for a RACH message and is associated with one of TDM, FDM, or SDM. The communication manager 1132 includes a determination component 1140 that is configured, e.g., as described in connection with 704, to determine a transmission type of the RACH message, the transmission type corresponding to one or more of the TDM, the FDM, or the SDM. The transmission component 1134 is configured, e.g., as described in connection with 706, to transmit the RACH message based on at least one parameter set of the plurality of parameter sets, the at least one parameter set associated with the determined transmission type of the RACH message.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving a configuration for a plurality of parameter sets, each of the plurality of parameter sets includes one or more parameters for a random access channel (RACH) message and is associated with one of time division multiplexing (TDM), frequency division multiplexing (FDM), or spatial division multiplexing (SDM); means for determining a transmission type of the RACH message, the transmission type corresponding to one or more of the TDM, the FDM, or the SDM; and means for transmitting the RACH message based on at least one parameter set of the plurality of parameter sets, the at least one parameter set associated with the determined transmission type of the RACH message. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
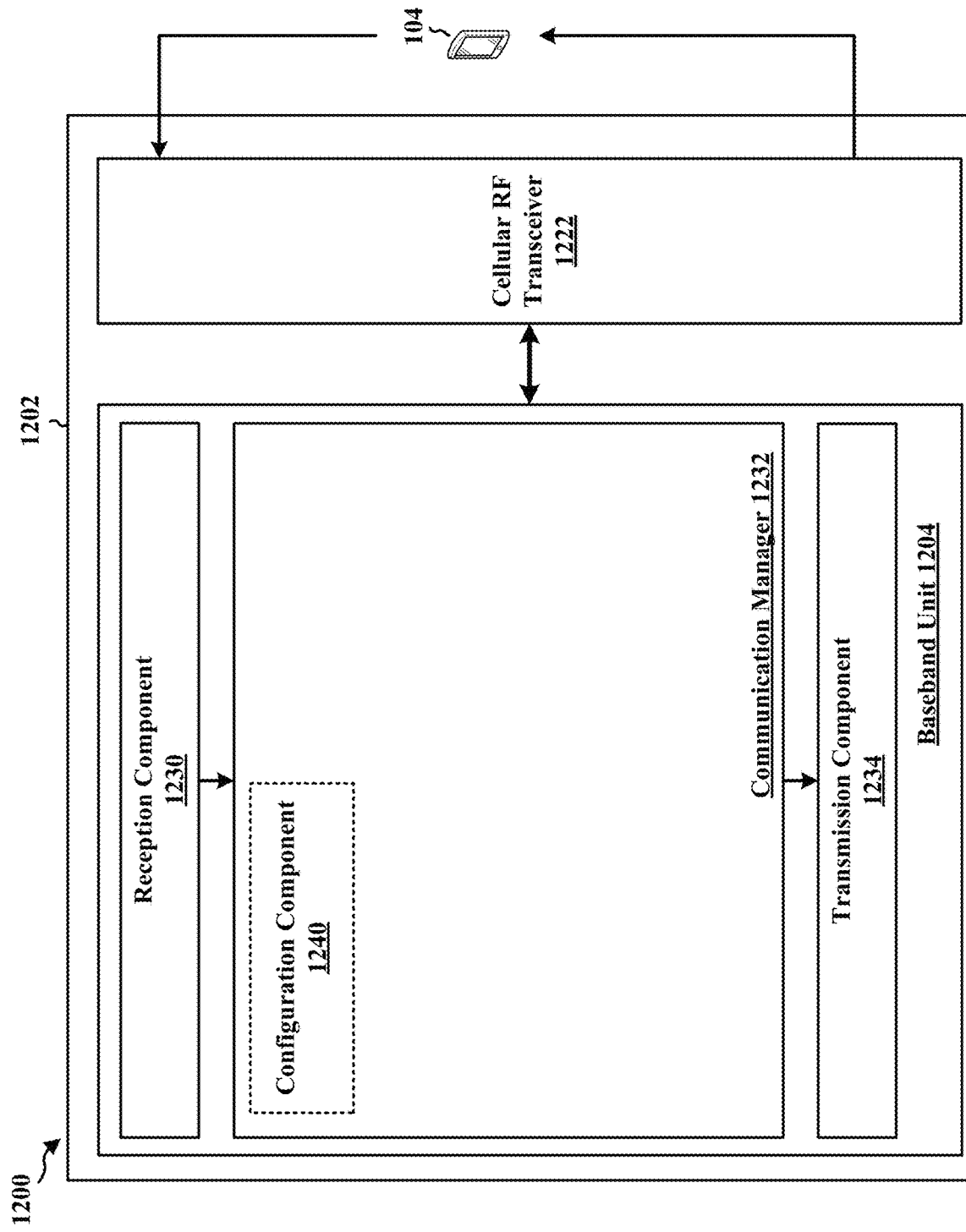
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The reception component 1230 is configured, e.g., as described in connection with 814, to receive the RACH message based on at least one parameter set of the plurality of parameter sets, the at least one parameter set associated with a transmission type of the RACH message, the transmission type corresponding to one or more of the TDM, the FDM, or the SDM. The communication manager 1232 includes a configuration component 1240 that is configured, e.g., as described in connection with 802, 804, 808, and 810, to configure a plurality of parameter sets based on different parameter sets of the plurality of parameter sets for each of TDM, FDM, and SDM; to configure a plurality of parameter sets based on a common parameter set of the plurality of parameter sets for TDM, FDM, and SDM and different parameter sets of the plurality of parameter sets for each of the TDM, the FDM, and the SDM; to configure the plurality of parameter sets for a RACH message in a connected mode based on RRC signaling; and to configure the plurality of parameter sets for a RACH message in a broadcast mode based on RMSI. The transmission component 1234 is configured, e.g., as described in connection with 812, to transmit a configuration for the plurality of parameter sets, each of the plurality of parameter sets includes one or more parameters for the RACH message and is associated with one of the TDM, the FDM, or the SDM.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting a configuration for a plurality of parameter sets, each of the plurality of parameter sets includes one or more parameters for a RACH message and is associated with one of TDM, FDM, or SDM; and means for receiving the RACH message based on at least one parameter set of the plurality of parameter sets, the at least one parameter set associated with a transmission type of the RACH message, the transmission type corresponding to one or more of the TDM, the FDM, or the SDM. The apparatus 1202 further includes means for configuring the plurality of parameter sets based on different parameter sets of the plurality of parameter sets for each of the TDM, the FDM, and the SDM. The apparatus 1202 further includes means for configuring the plurality of parameter sets based on a common parameter set of the plurality of parameter sets for the TDM, the FDM, and the SDM and different parameter sets of the plurality of parameter sets for each of the TDM, the FDM, and the SDM. The apparatus 1202 further includes means for configuring the plurality of parameter sets for the RACH message in a connected mode based on RRC signaling. The apparatus 1202 further includes means for configuring the plurality of parameter sets for the RACH message in a broadcast mode based on RMSI. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
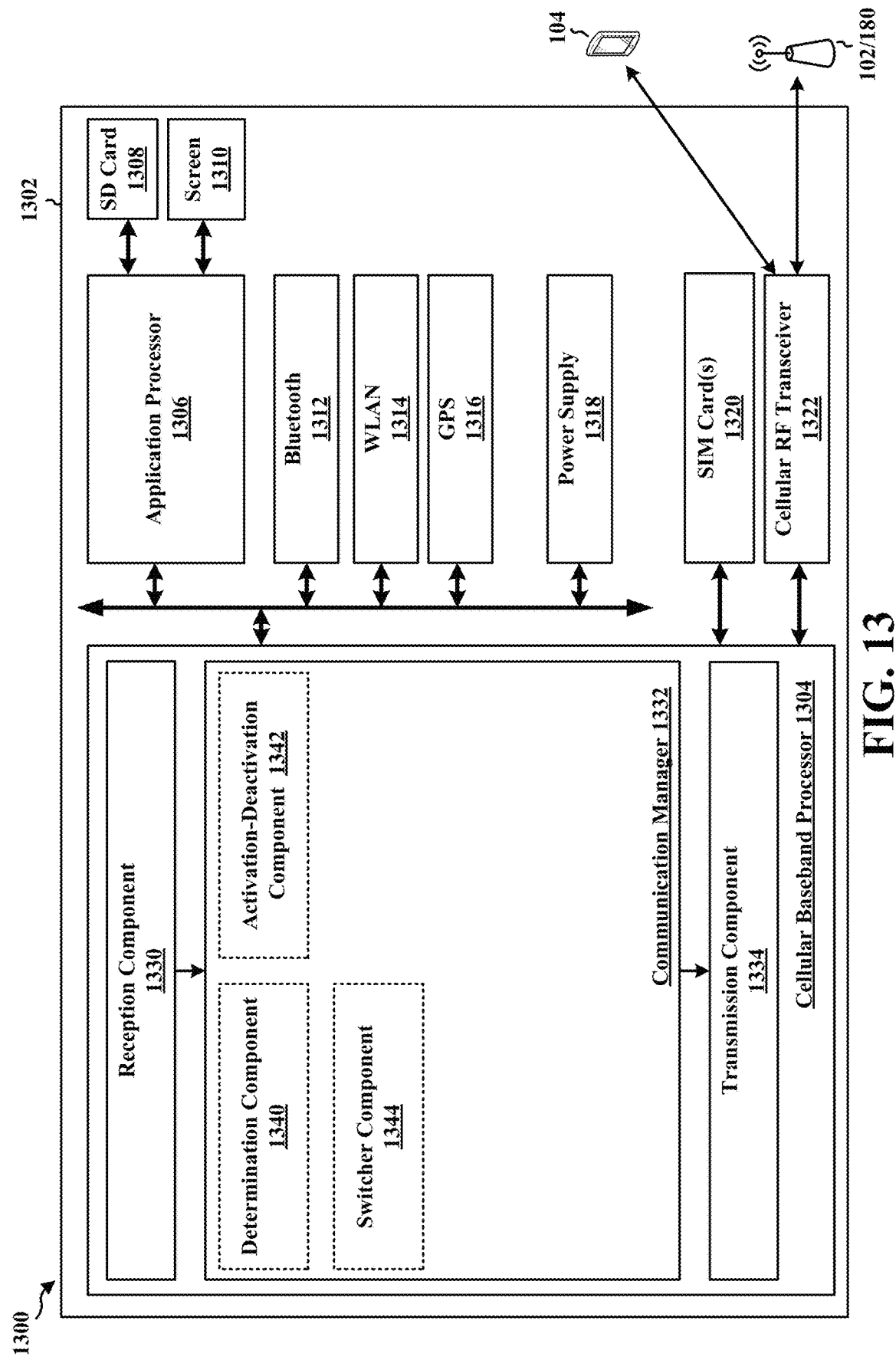
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more SIM cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The reception component 1330 is configured, e.g., as described in connection with 902, to receive a configuration for transmitting a RACH message, the configuration associated with a plurality of transmission types including TDM, FDM, and SDM. The communication manager 1332 includes a determination component 1340 that is configured, e.g., as described in connection with 904, to determine at least one transmission type of the plurality of transmission types for the RACH message, the at least one transmission type corresponding to one or more of the TDM, the FDM, or the SDM. The communication manager 1332 further includes an activation-deactivation component 1342 that is configured, e.g., as described in connection with 906, to deactivate or activate a FD mode of transmission for the RACH message, the FD mode of transmission corresponding to at least one of the FDM or the SDM, the deactivation or the activation indicated via the received configuration and based on a priority of a DL transmission. The communication manager 1332 further includes a switcher component 1344 that is configured, e.g., as described in connection with 908, to switch the at least one transmission type for the RACH message from a first transmission type of the plurality of transmission types to a second transmission type of the plurality of transmission types based on a number of retransmission attempts for the RACH message.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving a configuration for transmitting a RACH message, the configuration associated with a plurality of transmission types including TDM, FDM, and SDM; means for determining at least one transmission type of the plurality of transmission types for the RACH message, the at least one transmission type corresponding to one or more of the TDM, the FDM, or the SDM; and means for transmitting the RACH message based on the received configuration for the RACH message and the determined at least one transmission type of the RACH message. The apparatus 1302 further includes means for switching the at least one transmission type for the RACH message from a first transmission type of the plurality of transmission types to a second transmission type of the plurality of transmission types based on a number of retransmission attempts for the RACH message. The apparatus 1302 further includes means for deactivating or means for activating a FD mode of transmission for the RACH message, the FD mode of transmission corresponding to at least one of the FDM or the SDM, the deactivation or the activation indicated via the received configuration and based on a priority of a downlink (DL) transmission. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
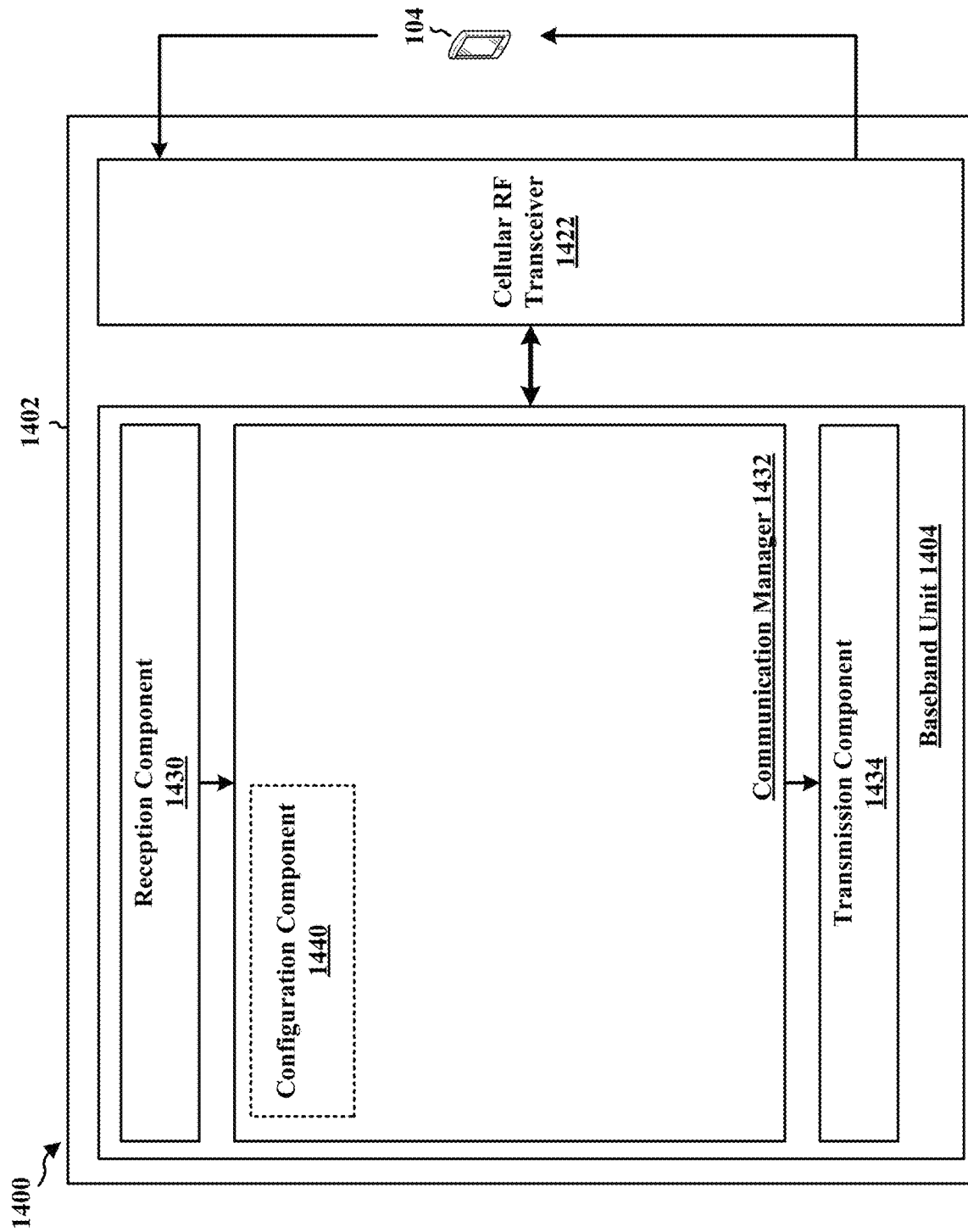
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The reception component 1430 is configured, e.g., as described in connection with 1006, to receive the RACH message based on the transmitted configuration for the RACH message and at least one transmission type of the plurality of transmission types of the RACH message, the at least one transmission type corresponding to one or more of the TDM, the FDM, or the SDM. The communication manager 1432 includes a configuration component 1440 that is configured, e.g., as described in connection with 1002, to configure, based on a priority of a DL transmission, a deactivation or an activation of a FD mode of transmission for a RACH message, the FD mode of transmission corresponding to at least one of FDM or SDM. The transmission component 1434 is configured, e.g., as described in connection with 1004, to transmit a configuration for the RACH message, the configuration associated with a plurality of transmission types including the TDM, the FDM, and the SDM.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for transmitting a configuration for a RACH message, the configuration associated with a plurality of transmission types including TDM, FDM, and SDM; and means for receiving the RACH message based on the transmitted configuration for the RACH message and at least one transmission type of the plurality of transmission types of the RACH message, the at least one transmission type corresponding to one or more of the TDM, the FDM, or the SDM. The apparatus 1402 further includes means for configuring, based on a priority of a DL transmission, a deactivation or an activation of a FD mode of transmission for the RACH message, the FD mode of transmission corresponding to at least one of the FDM or the SDM. The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, characterized by: receiving a configuration for a plurality of parameter sets, each of the plurality of parameter sets includes one or more parameters for a RACH message and is associated with one of TDM, FDM, or SDM; determining a transmission type of the RACH message, the transmission type corresponding to one or more of the TDM, the FDM, or the SDM; and transmitting the RACH message based on at least one parameter set of the plurality of parameter sets, the at least one parameter set associated with the determined transmission type of the RACH message.

Aspect 2 may be combined with aspect 1 and is characterized in that the configuration for the plurality of parameter sets corresponds to different parameter sets of the plurality of parameter sets for each of the TDM, the FDM, and the SDM.

Aspect 3 may be combined with any of aspects 1-2 and is characterized in that the different parameter sets include a first set of parameter sets associated with a two-step RACH procedure and a second set of parameter sets associated with a four-step RACH procedure.

Aspect 4 may be combined with any of aspects 1-3 and is characterized in that the different parameter sets are based on different values of the one or more parameters for each of the TDM, the FDM, and the SDM.

Aspect 5 may be combined with any of aspects 1 or 4 and is characterized in that the configuration for the plurality of parameter sets corresponds to a common parameter set of the plurality of parameter sets for the TDM, the FDM, and the SDM and different parameter sets of the plurality of parameter sets for each of the TDM, the FDM, and the SDM.

Aspect 6 may be combined with any of aspects 1 or 4-5 and is characterized in that the different parameter sets include a first set of parameter sets associated with a two-step RACH procedure and a second set of parameter sets associated with a four-step RACH procedure.

Aspect 7 may be combined with any of aspects 1-6 and is characterized in that the configuration for the plurality of parameter sets for the RACH message is received in a connected mode via RRC signaling.

Aspect 8 may be combined with any of aspects 1-6 and is characterized in that the configuration for the plurality of parameter sets for the RACH message is received in a broadcast mode via RMSI.

Aspect 9 may be combined with any of aspects 1-8 and is characterized in that the one or more parameters includes a SINR threshold for at least one of a SSB or a CSI-RS.

Aspect 10 is a method of wireless communication of a base station, characterized by: transmitting a configuration for a plurality of parameter sets, each of the plurality of parameter sets includes one or more parameters for a RACH message and is associated with one of TDM, FDM, or SDM; and receiving the RACH message based on at least one parameter set of the plurality of parameter sets, the at least one parameter set associated with a transmission type of the RACH message, the transmission type corresponding to one or more of the TDM, the FDM, or the SDM.

Aspect 11 may be combined with aspect 10 and is further characterized by configuring the plurality of parameter sets based on different parameter sets of the plurality of parameter sets for each of the TDM, the FDM, and the SDM.

Aspect 12 may be combined with any of aspects 10-11 and is characterized in that the different parameter sets include a first set of parameter sets associated with a two-step RACH procedure and a second set of parameter sets associated with a four-step RACH procedure.

Aspect 13 may be combined with any of aspects 10-12 and is characterized in that the different parameter sets are based on different values of the one or more parameters for each of the TDM, the FDM, and the SDM.

Aspect 14 may be combined with any of aspects 10 or 13 and is further characterized by configuring the plurality of parameter sets based on a common parameter set of the plurality of parameter sets for the TDM, the FDM, and the SDM and different parameter sets of the plurality of parameter sets for each of the TDM, the FDM, and the SDM.

Aspect 15 may be combined with any of aspects 10 or 13-14 and is characterized in that the different parameter sets include a first set of parameter sets associated with a two-step RACH procedure and a second set of parameter sets associated with a four-step RACH procedure.

Aspect 16 may be combined with any of aspects 10-15 and is further characterized by configuring the plurality of parameter sets for the RACH message in a connected mode based on RRC signaling.

Aspect 17 may be combined with any of aspects 10-15 and is further characterized by configuring the plurality of parameter sets for the RACH message in a broadcast mode based on RMSI.

Aspect 18 may be combined with any of aspects 10-17 and is characterized in that the one or more parameters includes a SINR threshold for at least one of a SSB or a CSI-RS.

Aspect 19 is a method of wireless communication of a UE, characterized by: receiving a configuration for transmitting a RACH message, the configuration associated with a plurality of transmission types including TDM, FDM, and SDM; determining at least one transmission type of the plurality of transmission types for the RACH message, the at least one transmission type corresponding to one or more of the TDM, the FDM, or the SDM; and transmitting the RACH message based on the received configuration for the RACH message and the determined at least one transmission type of the RACH message.

Aspect 20 may be combined with aspect 19 and is characterized in that the at least one transmission type for the RACH message is determined based on a latest occasion of the transmission type for the RACH message.

Aspect 21 may be combined with aspect 19 and is characterized in that the at least one transmission type is determined based on at least one of a measurement value for a RSRP of a SSB or a CSI-RS or a measurement value of a SINR of the SSB or the CSI-RS.

Aspect 22 may be combined with aspect 19 and is characterized in that the configuration includes a priority indication for the RACH message, the at least one transmission type determined based on the priority indication.

Aspect 23 may be combined with any of aspects 19 or 22 and is characterized in that the priority indication corresponds to a priority of a subscribed service class of the UE.

Aspect 24 may be combined with aspect 19 and is characterized in that the at least one transmission type is determined based on a purpose of the RACH message, the purpose corresponding to at least one of an initial access, a BFR, or a TA order.

Aspect 25 may be combined with any of aspects 19 or 24 and is characterized in that the initial access is associated with the TDM and each of the BFR and the TA order is associated with at least one of the FDM or the SDM.

Aspect 26 may be combined with aspect 19 and is further characterized by switching the at least one transmission type for the RACH message from a first transmission type of the plurality of transmission types to a second transmission type of the plurality of transmission types based on a number of retransmission attempts for the RACH message.

Aspect 27 may be combined with any of aspects 19-26 and is further characterized by deactivating or activating a FD mode of transmission for the RACH message, the FD mode of transmission corresponding to at least one of the FDM or the SDM, the deactivation or the activation indicated via the received configuration and based on a priority of a DL transmission.

Aspect 28 is a method of wireless communication of a base station, comprising: transmitting a configuration for a RACH message, the configuration associated with a plurality of transmission types including TDM, FDM, and SDM; and receiving the RACH message based on the transmitted configuration for the RACH message and at least one transmission type of the plurality of transmission types of the RACH message, the at least one transmission type corresponding to one or more of the TDM, the FDM, or the SDM.

Aspect 29 may be combined with aspect 28 and is characterized in that the at least one transmission type for the RACH message is based on a latest occasion of the transmission type for the RACH message.

Aspect 30 may be combined with aspect 28 and is characterized in that the at least one transmission type is based on at least one of a measurement value for a RSRP of a SSB or a CSI-RS or a measurement value of a SINR of the SSB or the CSI-RS.

Aspect 31 may be combined with aspect 28 and is characterized in that the configuration includes a priority indication for the RACH message, the at least one transmission type based on the priority indication.

Aspect 32 may be combined with any of aspects 28 or 31 and is characterized in that the priority indication corresponds to a priority of a subscribed service class of a UE to which the configuration is transmitted.

Aspect 33 may be combined with aspect 28 and is characterized in that the at least one transmission type is based on a purpose of the RACH message, the purpose corresponding to at least one of an initial access, a BFR, or a TA order.

Aspect 34 may be combined with any of aspects 28 or 33 and is characterized in that the initial access is associated with the TDM and each of the BFR and the TA order is associated with at least one of the FDM or the SDM.

Aspect 35 may be combined with aspect 28 and is characterized in that the RACH message is received based on a second transmission type of the plurality of transmission types, the at least one transmission type being switched to the second transmission type from a first transmission type of the plurality of transmission types based on a threshold number of retransmission attempts for the RACH message.

Aspect 36 may be combined with any of aspects 28-35 and is further characterized by configuring, based on a priority of a DL transmission, a deactivation or an activation of a FD mode of transmission for the RACH message, the FD mode of transmission corresponding to at least one of the FDM or the SDM.

Aspect 37 is an apparatus for wireless communication including at least one processor coupled to a memory and configured to implement a method as in any of aspects 1-36.

Aspect 38 is an apparatus for wireless communication including means for implementing a method as in any of aspects 1-36.

Aspect 39 is a computer-readable medium storing computer executable code, where the code when executed by a processor causes the processor to implement a method as in any of aspects 1-36.

What is claimed is:
1. A method of wireless communication of a user equipment (UE), comprising:

receiving a configuration for transmitting a random access channel (RACH) message, the configuration associated with a plurality of transmission types including time division multiplexing (TDM), frequency division multiplexing (FDM), and spatial division multiplexing (SDM);

determining at least one transmission type of the plurality of transmission types including the TDM, the FDM, and the SDM for the RACH message, the at least one transmission type corresponding to one or more of the TDM, the FDM, or the SDM;

transmitting the RACH message based on the received configuration for the RACH message and the determined at least one transmission type of the RACH message; and switching the at least one transmission type for the RACH message from a first transmission type of the plurality of transmission types to a second transmission type of the plurality of transmission types based on a number of retransmission attempts for the RACH message.

2. The method of claim 1, wherein the at least one transmission type for the RACH message is determined based on a latest occasion of the transmission type for the RACH message.

3. The method of claim 1, wherein the at least one transmission type is determined based on at least one of a measurement value for a reference signal received power (RSRP) of a synchronization signal block (SSB) or a channel state information-reference signal (CSI-RS) or a measurement value of a signal-to-interference-plus-noise ratio (SINR) of the SSB or the CSI-RS.

4. The method of claim 1, wherein the configuration includes a priority indication for the RACH message, the at least one transmission type determined based on the priority indication.

5. The method of claim 4, wherein the priority indication corresponds to a priority of a subscribed service class of the UE.

6. The method of claim 1, wherein the at least one transmission type is determined based on a purpose of the RACH message, the purpose corresponding to at least one of an initial access, a beam failure request (BFR), or a timing advance (TA) order.

7. The method of claim 6, wherein the initial access is associated with the TDM and each of the BFR and the TA order is associated with at least one of the FDM or the SDM.

8. The method of claim 1, further comprising deactivating or activating a full duplex (FD) mode of transmission for the RACH message, the FD mode of transmission corresponding to at least one of the FDM or the SDM, the deactivation or the activation indicated via the received configuration and based on a priority of a downlink (DL) transmission.

9. A method of wireless communication of a base station, comprising:

transmitting a configuration for a random access channel (RACH) message, the configuration associated with a plurality of transmission types including time division multiplexing (TDM), frequency division multiplexing (FDM), and spatial division multiplexing (SDM); and receiving the RACH message based on the transmitted configuration for the RACH message and at least one transmission type of the plurality of transmission types of the RACH message, the at least one transmission type corresponding to one or more selected ones of the TDM, the FDM, and the SDM, wherein the RACH message is received based on a second transmission type of the plurality of transmission types, the at least one transmission type being switched to the second transmission type from a first transmission type of the plurality of transmission types based on a threshold number of retransmission attempts for the RACH message.

10. The method of claim 9, wherein the at least one transmission type for the RACH message is based on a latest occasion of the transmission type for the RACH message.

11. The method of claim 9, wherein the at least one transmission type is based on at least one of a measurement value for a reference signal received power (RSRP) of a synchronization signal block (SSB) or a channel state information-reference signal (CSI-RS) or a measurement value of a signal-to-interference-plus-noise ratio (SINR) of the SSB or the CSI-RS.

12. The method of claim 9, wherein the configuration includes a priority indication for the RACH message, the at least one transmission type based on the priority indication.

13. The method of claim 12, wherein the priority indication corresponds to a priority of a subscribed service class of a user equipment (UE) to which the configuration is transmitted.

14. The method of claim 9, wherein the at least one transmission type is based on a purpose of the RACH message, the purpose corresponding to at least one of an initial access, a beam failure request (BFR), or a timing advance (TA) order.

15. The method of claim 14, wherein the initial access is associated with the TDM and each of the BFR and the TA order is associated with at least one of the FDM or the SDM.

16. The method of claim 9, further comprising configuring, based on a priority of a downlink (DL) transmission, a deactivation or an activation of a full duplex (FD) mode of transmission for the RACH message, the FD mode of transmission corresponding to at least one of the FDM or the SDM.

17. An apparatus for wireless communication of a user equipment (UE), comprising:

a memory; and at least one processor coupled to the memory and configured to:

receive a configuration for transmitting a random access channel (RACH) message, the configuration associated with a plurality of transmission types including time division multiplexing (TDM), frequency division multiplexing (FDM), and spatial division multiplexing (SDM);

determine at least one transmission type of the plurality of transmission types including the TDM, the FDM, and the SDM for the RACH message, the at least one transmission type corresponding to one or more of the TDM, the FDM, or the SDM;

transmit the RACH message based on the received configuration for the RACH message and the determined at least one transmission type of the RACH message, wherein the RACH message overlaps with a downlink transmission in a time domain or a frequency domain; and switch the at least one transmission type for the RACH message from a first transmission type of the plurality of transmission types to a second transmission type of the plurality of transmission types based on a number of retransmission attempts for the RACH message.

18. The apparatus of claim 17, wherein to determine the at least one transmission type, the at least one processor is configured to determine the at least one transmission type for the RACH message is based on a latest occasion of the transmission type for the RACH message.

19. The apparatus of claim 17, wherein to determine the at least one transmission type, the at least one processor is configured to determine the at least one transmission type based on at least one of a measurement value for a reference signal received power (RSRP) of a synchronization signal block (SSB) or a channel state information-reference signal (CSI-RS) or a measurement value of a signal-to-interference-plus-noise ratio (SINR) of the SSB or the CSI-RS.

20. The apparatus of claim 17, wherein the configuration includes a priority indication for the RACH message, the at least one transmission type determined based on the priority indication.

21. The apparatus of claim 17, wherein to determine the at least one transmission type, the at least one processor is configured to determine the at least one transmission type based on a purpose of the RACH message, the purpose corresponding to at least one of an initial access, a beam failure request (BFR), or a timing advance (TA) order.

22. An apparatus for wireless communication of a base station, comprising:
  a memory; and
  at least one processor coupled to the memory and configured to:
    transmit a configuration for a random access channel (RACH) message, the configuration associated with a plurality of transmission types including time division multiplexing (TDM), frequency division multiplexing (FDM), and spatial division multiplexing (SDM); and
    receive the RACH message based on the transmitted configuration for the RACH message and at least one transmission type of the plurality of transmission types of the RACH message, the at least one transmission type corresponding to one or more selected ones of the TDM, the FDM, and the SDM, wherein the RACH message is received based on a second transmission type of the plurality of transmission types, the at least one transmission type being switched to the second transmission type from a first transmission type of the plurality of transmission types based on a threshold number of retransmission attempts for the RACH message.

23. The apparatus of claim 22, wherein the at least one transmission type for the RACH message is based on a latest occasion of the transmission type for the RACH message.

24. The apparatus of claim 22, wherein the at least one transmission type is based on at least one of a measurement value for a reference signal received power (RSRP) of a synchronization signal block (SSB) or a channel state information-reference signal (CSI-RS) or a measurement value of a signal-to-interference-plus-noise ratio (SINR) of the SSB or the CSI-RS.

25. The apparatus of claim 22, wherein the configuration includes a priority indication for the RACH message, the at least one transmission type based on the priority indication.

26. The apparatus of claim 22, wherein the at least one transmission type is based on a purpose of the RACH message, the purpose corresponding to at least one of an initial access, a beam failure request (BFR), or a timing advance (TA) order.

* * * * *